United States Patent
Wu

(10) Patent No.: US 12,198,691 B2
(45) Date of Patent: Jan. 14, 2025

(54) VOICE WAKE-UP METHOD AND ELECTRONIC DEVICE

(71) Applicant: HUAWEI TECHNOLOGIES CO., LTD., Guangdong (CN)

(72) Inventor: Xiaohui Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 17/622,158

(22) PCT Filed: Jul. 14, 2020

(86) PCT No.: PCT/CN2020/101948
§ 371 (c)(1),
(2) Date: Dec. 22, 2021

(87) PCT Pub. No.: WO2021/008534
PCT Pub. Date: Jan. 21, 2021

(65) Prior Publication Data
US 2022/0366906 A1    Nov. 17, 2022

(30) Foreign Application Priority Data
Jul. 15, 2019    (CN) .......................... 201910637698.0

(51) Int. Cl.
*G06F 3/16*         (2006.01)
*G10L 15/08*        (2006.01)
(Continued)

(52) U.S. Cl.
CPC .............. *G10L 15/22* (2013.01); *G06F 3/165* (2013.01); *G10L 15/08* (2013.01); *G10L 15/30* (2013.01);
(Continued)

(58) Field of Classification Search
CPC ... G10L 15/22; G10L 2015/088; G10L 15/30; H04L 12/282
See application file for complete search history.

(56) References Cited

U.S. PATENT DOCUMENTS 9,734,822 B1 *  8/2017  Sundaram ............... G10L 15/08
9,779,735 B2 * 10/2017  Civelli .................... G10L 15/30
(Continued)

FOREIGN PATENT DOCUMENTS

CN        103971681 A      8/2014
CN        106030699 A     10/2016
(Continued)

*Primary Examiner* — Daniel C Washburn
*Assistant Examiner* — Oluwadamilola M Ogunbiyi

(57) ABSTRACT

A voice wake-up method is provided. The method includes: collecting a first voice signal in an environment in which the first electronic device is located. If audio is being played in the environment when the first voice signal is collected, obtaining, in a wired or wireless communication manner, an audio signal corresponding to the audio, determining a first false wake-up result based on the first voice signal and the audio signal; receiving a second false wake-up result sent by the second electronic device; determining a third false wake-up result based on the first false wake-up result and the second false wake-up result; wherein the third false wake-up result is used to indicate whether a wake-up operation needs to be performed on a to-be-woken-up device in a local area network; sending the third false wake-up result to another electronic device other than the first electronic device in the local area network.

20 Claims, 12 Drawing Sheets

(51) Int. Cl.
*G10L 15/22* (2006.01)
*G10L 15/30* (2013.01)
*G10L 21/0216* (2013.01)
*H04L 12/28* (2006.01)
*H04L 15/28* (2006.01)

(52) U.S. Cl.
CPC ........ *G10L 21/0216* (2013.01); *H04L 12/282* (2013.01); *G10L 2015/088* (2013.01); *H04L 2012/2841* (2013.01)

(56) References Cited

U.S. PATENT DOCUMENTS

| | | | |
|---|---|---|---|
| 10,079,015 B1 | 9/2018 | Lockhart et al. | |
| 10,163,442 B2* | 12/2018 | Civelli | G10L 15/22 |
| 10,573,321 B1* | 2/2020 | Smith | H04R 1/406 |
| 10,586,534 B1* | 3/2020 | Argyropoulos | G10L 15/22 |
| 10,687,233 B2* | 6/2020 | Simsek | H04W 88/06 |
| 11,064,281 B1* | 7/2021 | Batta | H04R 1/1041 |
| 11,157,696 B1* | 10/2021 | Ramos | G10L 15/02 |
| 2014/0012586 A1* | 1/2014 | Rubin | G10L 15/22 704/E21.001 |
| 2016/0104480 A1* | 4/2016 | Sharifi | G10L 15/285 704/254 |
| 2016/0104483 A1* | 4/2016 | Foerster | G10L 15/22 704/275 |
| 2016/0217790 A1* | 7/2016 | Sharifi | G10L 15/32 |
| 2017/0357478 A1 | 12/2017 | Piersol et al. | |
| 2018/0020309 A1 | 1/2018 | Banerjee et al. | |
| 2019/0043492 A1* | 2/2019 | Lang | G06F 3/167 |
| 2019/0066670 A1 | 2/2019 | White et al. | |
| 2019/0066678 A1* | 2/2019 | Tsukamoto | G10L 15/01 |
| 2019/0074014 A1* | 3/2019 | Wilberding | G10L 15/30 |
| 2019/0096398 A1 | 3/2019 | Sereshki | |
| 2019/0173687 A1* | 6/2019 | MacKay | G10L 15/22 |
| 2019/0221206 A1* | 7/2019 | Chen | G10L 15/22 |
| 2019/0251975 A1* | 8/2019 | Choi | G10L 17/06 |
| 2019/0311720 A1* | 10/2019 | Pasko | G06F 3/167 |
| 2020/0066279 A1* | 2/2020 | Kang | G10L 15/20 |
| 2020/0090646 A1* | 3/2020 | Smith | G10L 15/22 |
| 2020/0105295 A1* | 4/2020 | Sereshki | G10L 15/22 |
| 2020/0125162 A1* | 4/2020 | D'Amato | G06F 3/167 |
| 2020/0258512 A1* | 8/2020 | Smith | G06F 3/167 |
| 2020/0265838 A1* | 8/2020 | Lee | G06F 3/167 |
| 2020/0280861 A1* | 9/2020 | Choi | H04W 4/80 |
| 2020/0372901 A1* | 11/2020 | Yavagal | G10L 17/00 |
| 2021/0224078 A1* | 7/2021 | Busch | G06N 3/042 |
| 2021/0297950 A1* | 9/2021 | Sundman | H04W 74/0808 |
| 2021/0366506 A1* | 11/2021 | Han | H04W 4/80 |
| 2022/0028380 A1* | 1/2022 | Jung | G06F 3/167 |
| 2023/0215433 A1* | 7/2023 | Myers | G10L 15/22 704/251 |

FOREIGN PATENT DOCUMENTS

| | | | | |
|---|---|---|---|---|
| CN | 106098054 A | 11/2016 | | |
| CN | 108369574 A | 8/2018 | | |
| CN | 108766432 A | 11/2018 | | |
| CN | 109087650 A | 12/2018 | | |
| CN | 109087660 A | 12/2018 | | |
| CN | 109243456 A | 1/2019 | | |
| CN | 109389976 A | 2/2019 | | |
| CN | 109448710 A | 3/2019 | | |
| CN | 109493883 A | 3/2019 | | |
| CN | 110364151 A | 10/2019 | | |
| CN | 111028826 A | 4/2020 | | |
| IN | 108564947 A | 9/2018 | | |
| JP | H0683388 A | 3/1994 | | |
| JP | 2008263404 A | 10/2008 | | |
| JP | 2014123875 A | 7/2014 | | |
| JP | 2017011336 A | 1/2017 | | |
| JP | 2017520008 A | 7/2017 | | |
| JP | 2017227912 A | 12/2017 | | |
| JP | 6427549 B2 * | 11/2018 | | G10L 15/01 |
| JP | 2019525235 A | 9/2019 | | |
| JP | 2020536273 A | 12/2020 | | |
| WO | 2016057268 A1 | 4/2016 | | |
| WO | 2019067720 A1 | 4/2019 | | |

* cited by examiner

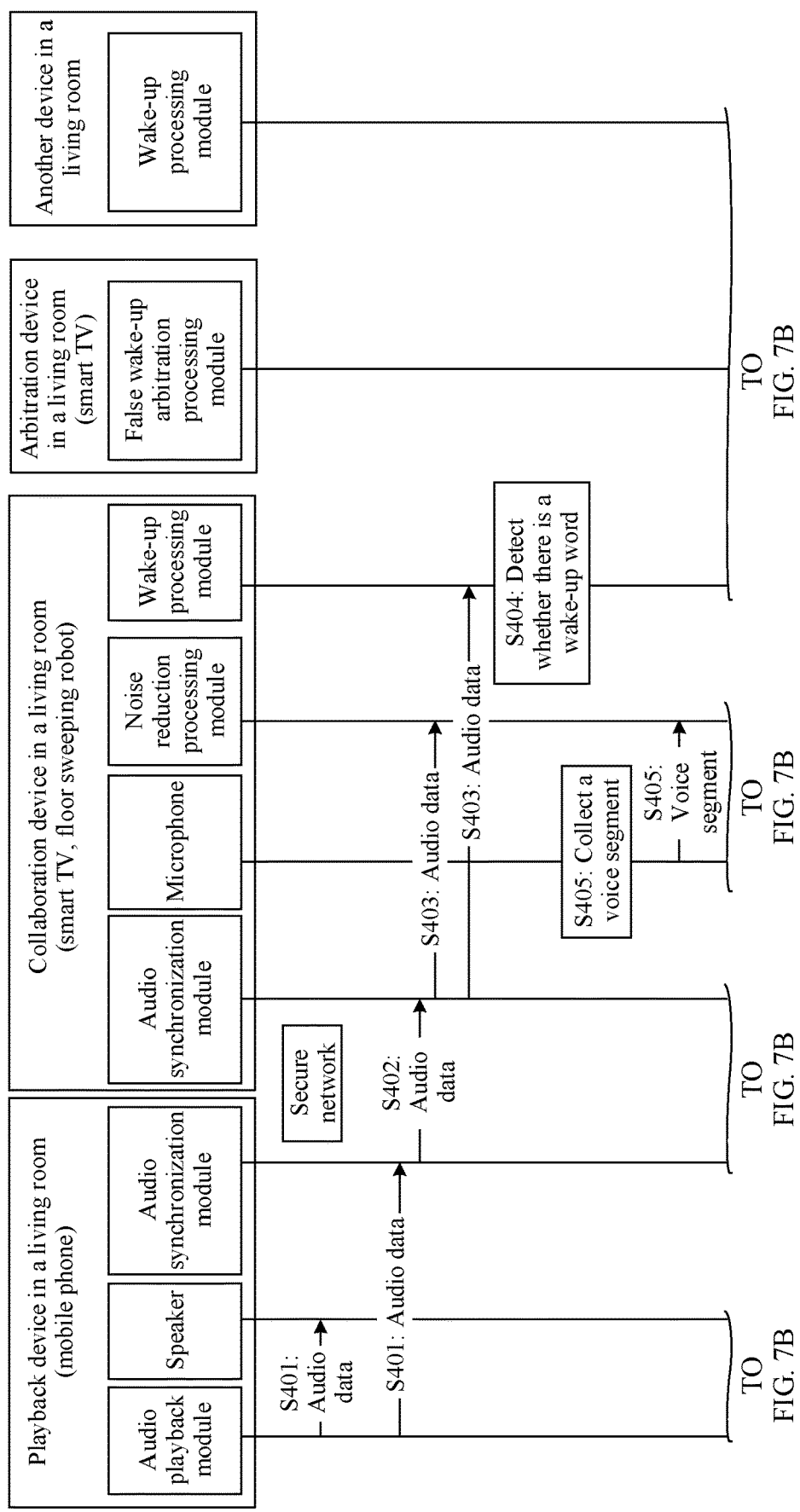

500

501 — Collect a first voice signal in an environment in which a first electronic device is located 502 — Obtain, in a wired or wireless communication manner, an audio signal corresponding to audio in a collection period of the first voice signal 503 — Determine a first false wake-up result based on the first voice signal and the audio signal 504 — Receive a second false wake-up result sent by a second electronic device 505 — Determine a third false wake-up result based on the first false wake-up result and the second false wake-up result 506 — Send the third false wake-up result to another electronic device other than the first electronic device in a local area network

FIG. 8

VOICE WAKE-UP METHOD AND ELECTRONIC DEVICE

CROSS-REFERENCE TO RELATED APPLICATIONS

The present application is a National Stage of International Patent Application No. PCT/CH2020/101948, filed on Jul. 14, 2020, which claims priority to Chinese Patent Application No. 2019106376980, filed on Jul. 15, 2019. Both of the aforementioned applications are hereby incorporated by reference in their entireties.

TECHNICAL FIELD

This application relates to the field of electronic devices, and more specifically, to a voice wake-up method and an electronic device.

BACKGROUND

Although smart voice devices on the market have made great progress in accuracy of voice wake-up, noise reduction, and recognition currently, voice recognition is poor when there is background noise. Particularly, when a user is relatively far away from a to-be-woken-up device and there is background noise, a wake-up rate is lower, and relatively high false wake-up occurs.

SUMMARY

This application provides a voice wake-up method and an electronic device, to help improve accuracy of false wake-up determining.

According to a first aspect, a voice wake-up method is provided. The method is applied to a first electronic device, the first electronic device is located in a local area network, the local area network further includes a second electronic device, and the method includes: The first electronic device collects a first voice signal in an environment in which the first electronic device is located. The first electronic device obtains, in a wired or wireless communication manner, an audio signal corresponding to audio in a collection period of the first voice signal. The first electronic device determines a first false wake-up result based on the first voice signal and the audio signal. The first electronic device receives a second false wake-up result sent by the second electronic device. The second false wake-up result is obtained by the second electronic device based on a collected second voice signal and the audio signal. The first electronic device determines a third false wake-up result based on the first false wake-up result and the second false wake-up result. The third false wake-up result is used to indicate whether a wake-up operation needs to be performed on a to-be-woken-up device in the local area network. The first electronic device sends the third false wake-up result to another electronic device other than the first electronic device in the local area network.

According to the voice wake-up method in this embodiment of this application, the first electronic device may determine a final false wake-up result by using a false wake-up result determined by the first electronic device and by receiving a false wake-up result sent by the second electronic device, and send the result to the another electronic device other than the first electronic device in the local area network. This helps improve accuracy of false wake-up determining. In addition, other devices in the local area network are prevented from performing false wake-up determining, and to some extent, audio data may be prevented from occupying a large amount of bandwidth.

In some possible implementations, the first electronic device is an electronic device having a strongest computing capability in the local area network; and/or the first electronic device is a non-power-consumption-sensitive electronic device in the local area network.

In this embodiment of this application, an electronic device having a relatively strong computing capability and/or a non-power-consumption-sensitive electronic device may be selected as an electronic device for performing false wake-up determining. This helps avoid some power consumption-sensitive devices, and helps reduce power consumption of the electronic device. This also helps prevent a device having a relatively weak computing capability from performing false wake-up detection, thereby avoiding impact on proper working of the electronic device.

In some possible implementations, the first electronic device may alternatively be a device that is playing audio in an environment.

With reference to the first aspect, in some implementations of the first aspect, the determining a third false wake-up result based on the first false wake-up result and the second false wake-up result includes: when the first false wake-up result is false wake-up and the second false wake-up result is false wake-up, determining that the third false wake-up result is false wake-up; or when the first false wake-up result is not false wake-up or the second false wake-up result is not false wake-up, determining that the third false wake-up result is not false wake-up.

It should be understood that the foregoing is merely a process in which the electronic device performs a final false wake-up determining based on the two false wake-up results. This is not limited in this embodiment of this application.

For example, the first electronic device may further receive a false wake-up result sent by a third electronic device, so that the first electronic device may determine the final false wake-up result based on the false wake-up result made by the first electronic device, the false wake-up result made by the second electronic device, and the false wake-up result made by the third electronic device.

With reference to the first aspect, in some implementations of the first aspect, the determining a first false wake-up result based on the first voice signal and the audio signal includes: performing noise reduction processing on the first voice signal based on the audio signal to obtain the second voice signal; and determining the first false wake-up result based on the audio signal and the second voice signal.

With reference to the first aspect, in some implementations of the first aspect, the determining the first false wake-up result based on the audio signal and the second voice signal includes: when it is determined that the audio signal includes a wake-up word, and the second voice signal does not include the wake-up word, determining that the first false wake-up result is false wake-up.

With reference to the first aspect, in some implementations of the first aspect, the audio signal includes a timestamp, and the timestamp is used to indicate a generation time of the audio signal.

In some possible implementations, the audio signal is split by a playback device into a plurality of audio segments, and each audio segment carries a corresponding timestamp.

In this embodiment of this application, the audio signal carries a timestamp, so that the first electronic device may determine, by using the timestamp, an audio segment on"

which noise reduction processing is performed on the first voice signal, and noise reduction processing can be performed on the first voice signal by using an appropriate audio segment.

In some possible implementations, after the first electronic device receives the audio signal, the method further includes: The first electronic device adds a delay to the audio signal.

According to a second aspect, a voice wake-up method is provided. The method is applied to a voice wake-up system, the system includes a playback device, a first collaboration device, a second collaboration device, and an arbitration device that are in a same local area network, and the method includes: The first collaboration device and the second collaboration device respectively collect a first voice signal and a second voice signal in an environment in which the first collaboration device and the second collaboration device are located. When the first collaboration device and the second collaboration device respectively collect the first voice signal and the second voice signal in the environment in which the first collaboration device and the second collaboration device are located, if the playback device is playing audio, the playback device sends, in a wired or wireless communication manner, an audio signal corresponding to the audio to the first collaboration device and the second collaboration device. The first collaboration device determines a first false wake-up result based on the first voice signal and the audio signal. The second collaboration device determines a second false wake-up result based on the second voice signal and the audio signal. The first collaboration device and the second collaboration device respectively send the first false wake-up result and the second false wake-up result to the arbitration device. The arbitration device determines a third false wake-up result based on the first false wake-up result and the second false wake-up result. The third false wake-up result is used to indicate whether a wake-up operation needs to be performed on a to-be-woken-up device in the local area network. The arbitration device sends the third false wake-up result to another device other than the arbitration device in the local area network.

According to the voice wake-up method in this embodiment of this application, the arbitration device may determine a final false wake-up result by using the first false wake-up result determined by the first collaboration device and the second false wake-up result determined by the second collaboration device, and send the result to the another electronic device other than the arbitration device in the local area network. This helps improve accuracy of false wake-up determining. In addition, other devices in the local area network are prevented from performing false wake-up determining, and to some extent, audio data may be prevented from occupying a large amount of bandwidth.

In some possible implementations, the first collaboration device and the arbitration device are a same device.

In some possible implementations, the playback device, the first collaboration device, and the arbitration device are a same device.

With reference to the second aspect, in some possible implementations of the second aspect, the method further includes: The play back device receives capability information sent by another device other than the play back device in the local area network. The capability information is used to indicate a computing capability and/or a power consumption status of the another device. The play back device determines the first collaboration device and the second collaboration device in the local area network based on the capability information. The playback device sends indication information to the another device. The indication information is used to indicate the first collaboration device and the second collaboration device.

In this embodiment of this application, when playing audio, the play back device may determine the first collaboration device and the second collaboration device based on the capability information of each device in the local area network, so as to send a corresponding audio signal to the first collaboration device and the second collaboration device. In this way, other devices in the local area network are prevented from performing false wake-up determining, and to some extent, audio data may be prevented from occupying a large amount of bandwidth.

In some possible implementations, the playback device may further determine the arbitration device in the local area network based on the capability information. The playback device sends indication information to the another device. The indication information is used to indicate the arbitration device, the first collaboration device, and the second collaboration device.

In some possible implementations, the playback device may determine the first collaboration device and the second collaboration device. An arbitration device determined by each device in the local area network is the same.

With reference to the second aspect, in some possible implementations of the second aspect, that the playback device determines the first collaboration device and the second collaboration device in the local area network based on the capability information includes: The play back device determines a plurality of collaboration devices in the local area network based on the capability information. The plurality of collaboration devices include the first collaboration device and the second collaboration device. The play back device determines the first collaboration device and the second collaboration device from the plurality of collaboration devices based on a distance between the playback device and each collaboration device in the plurality of collaboration devices.

With reference to the second aspect, in some possible implementations of the second aspect, a first distance between the first collaboration device and the playback device or a second distance between the second collaboration device and the playback device is less than a third distance, and the third distance is a distance between the playback device and any collaboration device in other collaboration devices in the plurality of collaboration devices other than the first collaboration device and the second collaboration device.

In this embodiment of this application, the play back device may select a plurality of devices that are relatively close to the playback device as collaboration devices, to help avoid a problem that accuracy of false wake-up determining is reduced due to sound wave attenuation.

In some possible implementations, the audio signal includes a timestamp, and the timestamp is used to indicate a generation time of the audio signal.

According to a third aspect, this technical solution provides a voice wake-up apparatus. The apparatus is included in an electronic device, and the apparatus has a function of implementing behavior of the electronic device in the first aspect and the possible implementations of the first aspect. The function may be implemented by hardware, or may be implemented by hardware executing corresponding software. The hardware or the software includes one or more modules or units corresponding to the foregoing function.

According to a fourth aspect, this technical solution provides an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the voice wake-up method in any possible implementation of the first aspect.

According to a fifth aspect, the technical solution provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the voice wake-up method in any possible implementation of the first aspect.

According to a sixth aspect, this technical solution provides a voice wake-up system. The system includes the playback device, the first collaboration device, the second collaboration device, and the arbitration device in the second aspect. Alternatively, the system includes the playback device, the first collaboration device, and the second collaboration device in the second aspect. The arbitration device and the first collaboration device may be a same device. Alternatively, the system includes the first collaboration device and the second collaboration device in the second aspect, and the playback device, the arbitration device, and the first collaboration device may be a same device.

According to a seventh aspect, this technical solution provides a computer storage medium, including computer instructions. When the computer instructions are run on an electronic device, the electronic device is enabled to perform the voice wake-up method in any possible implementation of the foregoing aspects.

According to an eighth aspect, the technical solution provides a computer program product. When the computer program product runs on an electronic device, the electronic device is enabled to perform the voice wake-up method in any possible implementation of the foregoing aspects.

BRIEF DESCRIPTION OF DRAWINGS

FIG. 7A and FIG. 7B are another schematic flowchart of a voice wake-up method according to an embodiment of this application:

FIG. 8 is another schematic flowchart of a voice wake-up method according to an embodiment of this application:

DESCRIPTION OF EMBODIMENTS

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly. It should be further understood that in the following embodiments of this application, "at least one" and "one or more" refer to one, two, or more. The term "and/or" is used to describe an association relationship of an associated object, and indicates that there may be three relationships. For example, A and/or B may represent a case in which only A exists, both A and B exist, and only B exists, where A and B may be singular or plural. The character "/" usually indicates an "or" relationship between associated objects.

Reference to "one embodiment" or "some embodiments" described in this specification or the like means that one or more embodiments of this application include a particular feature, structure, or characteristic described in combination with the embodiment. Therefore, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. The terms "include", "contain", "have", and their variants all mean "include but are not limited to", unless otherwise specifically emphasized.

The following describes an electronic device provided and designed in the embodiments of this application, a user interface for such an electronic device, and an embodiment for using such an electronic device. In some embodiments, the electronic device may be a portable electronic device that further includes another function, such as a mobile phone, a tablet computer, or a wearable electronic device (such as a smartwatch) having a wireless communication function. An example embodiment of the portable electronic device includes but is not limited to a portable electronic device using iOS®, Android®, Microsoft®, or another operating system. The portable electronic device may alternatively be another portable electronic device, such as a laptop (Laptop). It should be further understood that, in some other embodiments, the foregoing electronic device may not be the portable electronic device but a desktop computer. In some embodiments, the electronic device may be a smart home appliance, such as a smart speaker or a smart home device.

Figure 1:
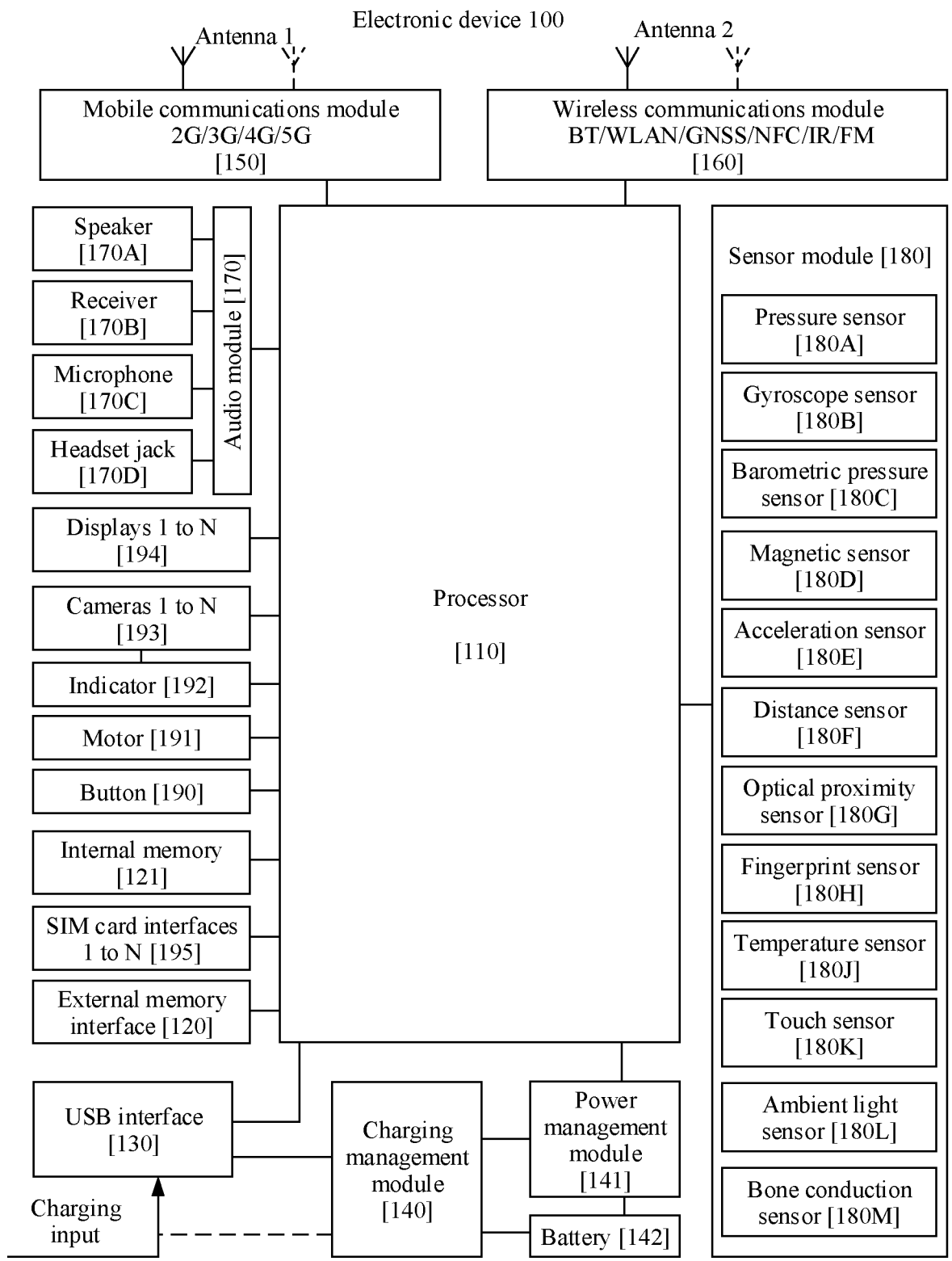
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In this embodiment of this application, the processor 110 may include a noise reduction processing module and a wake-up processing module described in the following embodiments.

For example, the noise reduction processing module in the processor 110 may perform, by using audio data received from a play back device by using the wireless communications module 160, noise reduction processing on a voice signal in an environment received by using the microphone 170C.

For example, the wake-up processing module in the processor 110 may analyze whether the audio data and the voice signal obtained after noise reduction processing include a wake-up word, so as to determine whether false wake-up occurs or not.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB interface 130 is an interface that conforms to USB standard specifications, and may be specifically a Mini USB interface, a Micro USB interface, a USB Type C interface, or the like. The USB interface 130 may be used to connect to a charger for charging the electronic device 100, may be used for transmission of data between the electronic device 100 and a peripheral device, or may be used to connect to a headset for playing audio by using the headset. Alternatively, the interface may be used to connect to another electronic device, for example, an AR device.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory; the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device with the mobile communications module 150 or another function module.

The wireless communications module 160 may provide a solution, applied to the electronic device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In this embodiment of this application, when the electronic device 100 is used as a collaboration device, the electronic device 100 may receive the audio data from the playback device by using the wireless communications module 160.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of encoding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function and an image playing function), and the like. The data storage area may store data (for example, audio data and a phone book) created when the electronic device 100 is used, and the like. In addition, the internal memory 121 may include a high-speed random access memory, and may further include a nonvolatile memory; for example, at least one magnetic disk storage device, a flash memory; and a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

In this embodiment of this application, the electronic device 100 may be used as a playback device, and send a sound signal outwards by using the speaker 170A, and another electronic device may collect, by using a speaker of the electronic device, the sound signal sent by the electronic device 100 and a voice signal mixed with a human voice.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

In this embodiment of this application, the electronic device 100 may be used as a to-be-woken-up device or the collaboration device, and receive the voice signal in the environment by using the microphone 170C.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a message application icon, instructions for viewing a message are executed. When a touch operation whose touch operation intensity is greater than or equal to the first pressure threshold is performed on a message application icon, instructions for creating a message are executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during photographing. For example, when a shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the flip cover is set based on a detected opening or closing state of the flip cover or a detected opening or closing state of the clamshell.

The acceleration sensor 180E may detect a magnitude of an acceleration of the electronic device 100 in each direction (usually, on three axes). When the electronic device 100 is still, a magnitude and a direction of gravity may be detected. The acceleration sensor may be further configured to identify a posture of the electronic device, and is used in an application such as switching between a landscape mode and a portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, to automatically perform screen-off to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats up the battery 142, to avoid abnormal shutdown of the electronic device 100 due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer a detected touch operation to the application processor, to determine a type of a touch event. A visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170) may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

Before this embodiment of this application is described, several concepts in voice wake-up are first described.

Wake-up word: a character string used to wake up an electronic device. For example, the wake-up word is "XiaoYi Xiao Yi" and the like.

Voice wake-up operation: The voice wake-up operation includes two parts: a wake-up operation and a recognition operation.

The wake-up operation means that a user speaks the wake-up word to wake up the electronic device, so that the electronic device is in a state of waiting for a voice instruction.

Voice instruction: an instruction for controlling the electronic device by using a voice to perform a corresponding voice operation. For example, the voice operation may be "book me an air ticket from Beijing to Shanghai tomorrow morning", "navigate home", "play music", and the like.

Recognition operation: After the electronic device is woken up, the user speaks the voice instruction to control the electronic device to perform the corresponding voice operation.

Currently, the following problems exist during device wake-up.

(1) If the user wakes up a wake-up device while a playback device plays audio, the audio of the playback device may cause interference to the wake-up device. Consequently, the wake-up device is falsely woken up or cannot be woken up.

For example, when a TV is playing the TV series "Little Aunt Dohe", a speaker is placed beside the TV. Because the wake-up word "Xiao Yi XiaoYi" (Yi is Chinese Pinyin with the second tone) is said in the TV series, and sounds the same as the wake-up word "Xiao Yi Xiao Yi" (Yi is Chinese Pinyin with the fourth tone) of the speaker, the speaker may be falsely woken up.

(2) Currently; when a device is woken up, a spacing between the wake-up device and the play back device is not considered. A delay occurs in a propagation process of sound of the playback device, and the user wakes up the device in this time period. If the sound of the play back device is not buffered in the wake-up device, after the wake-up device receives the sound "XiaoYi XiaoYi" (Yi is Chinese Pinyin with the second tone) of the playback device, the wake-up device is falsely woken up. Because there is no secure communication guarantee for audio data transmission between the play back device and the wake-up device, and no timestamp is added, if the wake-up device does not buffer audio data received from a network, when there are a plurality of devices in the network, the wake-up device may first receive, from the network, audio data with a relatively long physical distance and receive, from a microphone, sound with a relatively short physical distance, and then receive, from the network, audio data with a relatively short physical distance and receive, from the microphone, audio data with a relatively long physical distance. This disordered data may cause false wake-up or wake-up failure.

Figure 2:
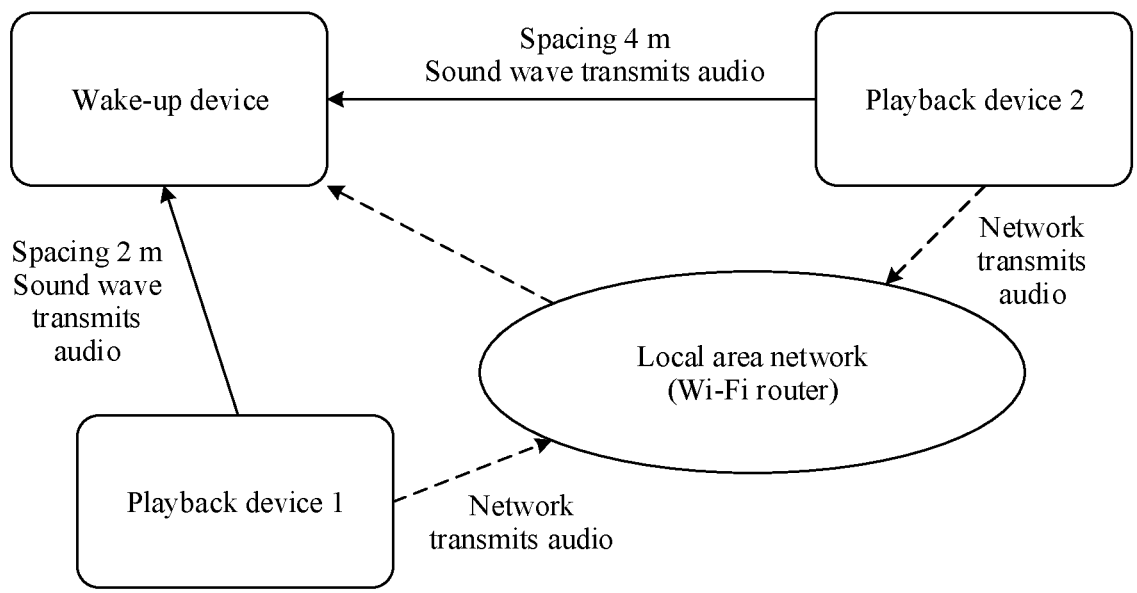
FIG. 2 is a schematic diagram of an application scenario to which a technical solution according to an embodiment of this application is applicable.

FIG. 2 is a schematic diagram of an application scenario to which a technical solution according to an embodiment of this application is applicable. As shown in FIG. 2, the application scenario includes a wake-up device, a playback device 1, and a playback device 2. A spacing between the wake-up device and the playback device 1 is 2 meters, a spacing between the wake-up device and the playback device 2 is 4 meters, and the wake-up device, the playback device 1, and the play back device 2 are connected by using a local area network.

The playback device 1 is relatively close to the wake-up device. The wake-up device first receives audio transmitted by the playback device 1 by using a sound wave and audio data transmitted by the playback device 2 by using the local area network, and then receives audio transmitted by the playback device 2 by using a sound wave and audio data transmitted by the playback device 1 by using the local area network. If the wake-up device performs noise reduction processing on the audio by using the audio data transmitted by the playback device 2 when receiving the audio transmitted by the playback device 1, false wake-up or wake-up failure may occur.

(3) There may be about 10 or more smart devices (such as mobile phones, smart watches, smart TVs, smart speakers, smart alarms, air conditioners, desk lamps, floor sweeping robots, and smart cameras) in an actual home network. Transmitting audio data between these devices may cause the following problems: First, a large amount of audio data is transmitted, and bandwidth is occupied. Second, computing processing is increased, and a power consumption loss occurs for some power consumption-sensitive smart devices such as mobile phones and smart watches.

(4) Processing problems of some devices that have weak computing capabilities, such as desk lamps and smart cameras, cannot be solved. Adding computing processing to the audio may occupy a relatively large quantity of computing resources of these devices, affecting normal use of the devices.

Figure 3:
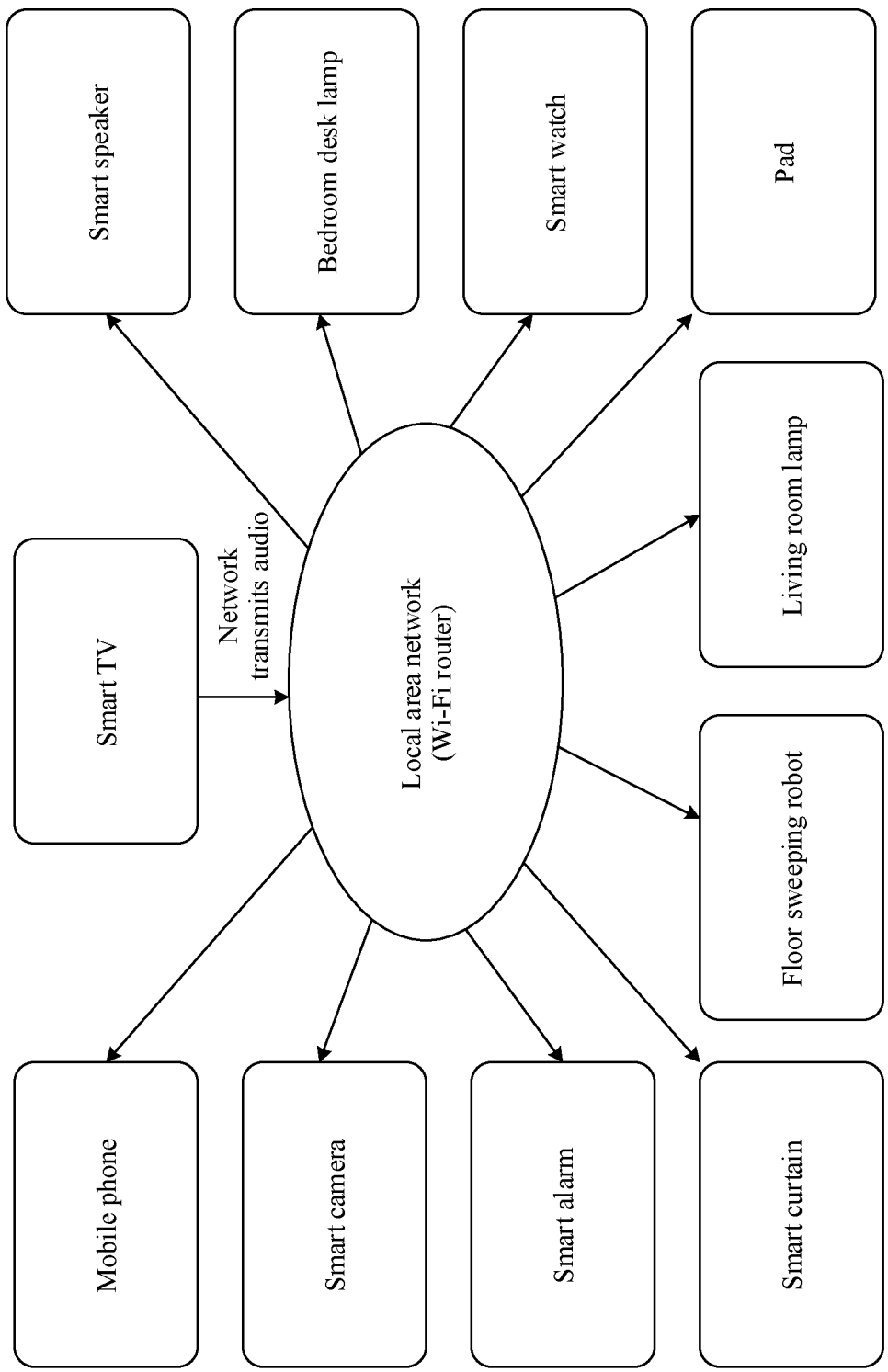
FIG. 3 is a schematic diagram of another application scenario to which a technical solution according to an embodiment of this application is applicable.

FIG. 3 is a schematic diagram of another application scenario to which a technical solution according to an embodiment of this application is applicable. As shown in FIG. 3, the application scenario includes a smart TV, a mobile phone, a smart camera, a smart alarm, a smart curtain, a floor sweeping robot, a living room lamp, a pad, a smart watch, a bedroom desk lamp, and a smart speaker. These devices can be connected by using a local area network (Wi-Fi router).

In this embodiment of this application, a wake-up noise reduction coordination platform is constructed by using a plurality of smart devices (having a smart voice function), to resolve a problem that a single device cannot resolve a false wake-up problem caused by external noise, and resolve a problem that wireless audio data is transmitted in a home network. A device and an arbitration device that perform false wake-up in coordination are selected based on power consumption and a computing capability of the device, so that a smart device that is sensitive to power consumption and a smart device that has a relatively weak computing capability can be avoided from performing computing.

Figure 4:
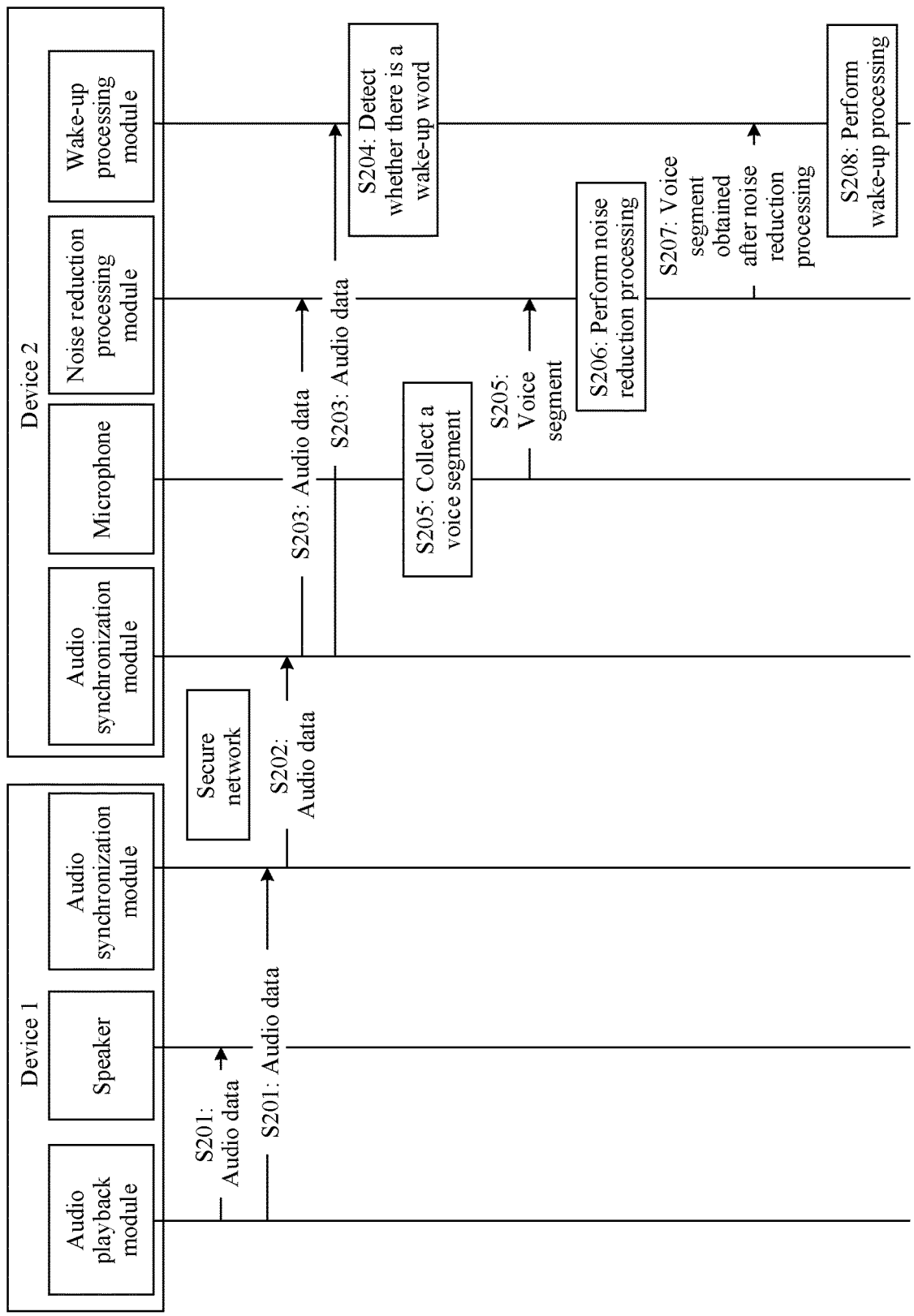
FIG. 4 is a schematic flowchart of a voice wake-up method according to an embodiment of this application.

FIG. 4 is a schematic flowchart of a voice wake-up method 200 according to an embodiment of this application. As shown in FIG. 4, the method 200 includes the following steps.

S201: A play back device (device 1) transmits played audio data to a speaker and an audio synchronization module by using an audio playback module.

In an implementation, the audio synchronization module of the play back device may carry a timestamp in the audio data.

For example, the playback device may split the audio data into audio segments (for example, each audio segment may be 40 ms), the playback device may add a timestamp to each audio segment, and the timestamp in each audio segment may be used to indicate a generation time of each audio segment. Therefore, after collecting a voice signal by using a microphone, a to-be-woken-up device selects a plurality of audio segments based on the timestamp in each audio segment, and performs noise reduction processing on the voice signal. The generation time of each audio segment may be a start moment of each audio segment, and a corresponding end moment is the start moment plus 40 ms.

In this embodiment of this application, when the play back device and the to-be-woken-up device are located in a same local area network, network time protocol (network time protocol, NTP) synchronization may be performed. The play back device adds a timestamp to the audio data, and the to-be-woken-up device may determine a time segment in which noise reduction processing is performed on audio data in a receiving buffer, or may manage buffered audio data to perform memory reclamation.

S202: The audio synchronization module transmits the audio data to an audio synchronization module of the to-be-woken-up device (device 2) by using a secure network.

The audio synchronization module of the to-be-woken-up device (device 2) may add a delay to the audio data.

For example, the to-be-woken-up device may add a delay of 30 to 40 ms to each received audio segment, for example, add 30 to 40 ms to the timestamp of each audio segment, so as to perform time synchronization with an audio signal received by using the microphone, and perform noise reduction processing on the audio signal by using an audio segment obtained after adding a delay.

It should be understood that a household range is generally 10 meters, a speed of sound propagation for data transmitted by sound is about 330 m/s, and a delay of sound propagation is about 30 ms (10/330). It is considered that adding a buffer to the audio synchronization module for 30 to 40 ms delay processing is to enable the to-be-woken-up device (device 2) to perform, by using the audio data received by the audio synchronization module when the voice signal is collected by using the microphone, noise reduction processing on the voice signal collected by the microphone.

It should be understood that the to-be-woken-up device may buffer the audio segment received from the playback device.

For example, the to-be-woken-up device may buffer audio data of 20s. After the buffer of the to-be-woken-up device is full of audio segments, the to-be-woken-up device may discard an audio segment with an earliest timestamp in the buffer, to receive a new audio segment.

S203: The to-be-woken-up device (device 2) transmits the audio data received by the audio synchronization module to a noise reduction processing module and a wake-up processing module.

S204: The wake-up processing module detects whether a wake-up word exists in the audio data.

In an embodiment, the wake-up processing module may be a digital signal processor (digital signal processor, DSP). The DSP may process an audio signal sent by the audio synchronization module, so as to learn, through analysis, whether the audio data includes the wake-up word.

In an embodiment, the wake-up processing module may include an automatic speech recognition (automatic speech recognition, ASR) module and a natural language understanding (natural language understanding, NLU) module.

The ASR module is mainly configured to recognize a speech of a user as text content, and the NLU module is mainly configured to understand an intent (intent) of the user, and perform slot (slot) parsing.

For example, information obtained by the ASR module by converting speech into text is as follows: Book me an air ticket from Beijing to Shanghai at 10:00 tomorrow morning.

From this sentence, the NLU module can parse the content shown in Table 1.

TABLE 1

| Intent (intent) | "Book an air ticket" |
|---|---|
| Slot (slot) | Departure time = "10:00 tomorrow morning" Departure city = "Beijing" Destination = "Shanghai" |

For example, a smart TV is playing the TV series "Little Aunt Dohe". At a moment, the smart TV sends audio data to an audio synchronization module of a smart speaker by using an audio synchronization module of the smart TV, and the audio synchronization module of the smart speaker may send the audio data to the ASR module. The ASR module converts the audio data into text information (for example, "XiaoYi XiaoYi" (Yi is Chinese Pinyin with the second tone)), and the NLU module determines that the audio data includes a wake-up word having a same pronunciation as the wake-up word "XiaoYi XiaoYi" (Yi is Chinese Pinyin with the fourth tone).

S205: The to-be-woken-up device (device 2) collects the voice signal by using the microphone, and the microphone sends the collected voice signal to the noise reduction processing module.

For example, the to-be-woken-up device collects the voice signal at a moment t1 by using the microphone. If the to-be-woken-up device does not add a delay to an audio segment, the playback device may use an audio segment whose timestamp is a moment t2 and an audio segment whose timestamp is a moment after the moment t2 as an audio segment on which noise reduction processing is performed, where t2=(t1−Δt), Δt is a propagation delay of audio played by the playback device in the air, and the delay may generally be 30 to 40 ms.

For example, if the to-be-woken-up device has added a delay to the audio segment (in other words, the to-be-woken-up device updates the timestamp of the audio segment, and a new timestamp is the original timestamp plus the delay), the to-be-woken-up device collects the voice signal at the moment t1 by using the microphone, and may search a buffer of the to-be-woken-up device for an audio segment whose timestamp is the moment t1 and an audio segment whose timestamp is a moment after the moment t1 as the audio segment on which noise reduction processing is performed.

S206: The noise reduction processing module of the to-be-woken-up device (device 2) uses the audio data sent by the audio playback device (device 1) as a reference signal to perform noise reduction processing on the voice signal collected by the microphone.

In an embodiment, the noise reduction processing module may be a DSP. The audio synchronization module and the microphone of the device 2 may input the audio data and the voice signal to the DSP, and synchronously process the audio data and the voice signal by using the DSP.

In a possible processing manner, the DSP filters the voice signal by using a noise reduction algorithm, to filter out the audio data played by the device 1 in the voice signal, so that only a voice spoken by the user remains in the voice signal. Then, the DSP may analyze the voice to determine whether the voice includes the wake-up word.

In a possible processing manner, after filtering the audio data in the voice signal to obtain the voice, the DSP may send the voice to the ASR module, and the ASR module converts the voice signal into text information. Finally, the NLU module analyzes whether the text information includes the wake-up word.

S207: The noise reduction processing module sends the voice signal obtained after the noise reduction processing to the wake-up processing module.

S208: The wake-up processing module performs processing by using the voice signal obtained after the noise reduction processing, and determines whether a voice segment obtained after the noise reduction processing includes the wake-up word.

If it is detected in S204 that the audio data includes the wake-up word, and the voice that is obtained by the noise reduction processing module by filtering the audio signal in the voice signal in S208 does not include the wake-up word, the device 2 may determine that a result is false wake-up, and the device 2 does not perform a wake-up operation.

If it is detected in S204 that the audio data does not include the wake-up word, and the voice that is obtained by the noise reduction processing module by filtering the audio signal in the voice signal in S208 includes the wake-up word, the device 2 may determine to perform a wake-up operation.

If it is detected in S204 that the audio data includes the wake-up word, and the voice that is obtained by the noise reduction processing module by filtering the audio data in the voice signal in S208 includes the wake-up word, the device 2 may determine to perform a wake-up operation.

If it is detected in S204 that the audio data does not include the wake-up word, and the voice that is obtained by the noise reduction processing module by filtering the audio data in the voice signal in S208 also does not include the wake-up word, the device 2 does not perform a wake-up operation.

According to the voice wake-up method in this embodiment of this application, the playback device may send the played audio data to the to-be-woken-up device, and the to-be-woken-up device may filter, by using the audio data, the voice signal collected by the microphone. This greatly reduces false wake-up caused by external noise received by the device, and can achieve an effect of avoiding false wake-up of the device through noise elimination.

The foregoing describes the method 200. According to the method 200, the to-be-woken-up device receives the audio data of the playback device, to perform noise reduction processing on the voice signal collected by the microphone, so as to avoid false wake-up of the to-be-woken-up device. Currently, there may be a large quantity of devices that have a voice capability in a home environment (or another environment), such as a mobile phone, a smart speaker, a smart TV, a smart alarm, a smart watch, or another smart home appliance. Some devices that have smart voice capabilities are power consumption-sensitive devices. For example, if a mobile phone or a smart watch frequently performs a wake-up operation, a power consumption loss occurs. Some devices that have voice capabilities may have relatively weak computing capabilities, such as desk lamps and smart cameras. Adding computing processing to the audio may occupy a relatively large quantity of computing resources of these devices, affecting normal use of the devices. Therefore, if the voice wake-up method shown in the method 200 is used, when the to-be-woken-up device is a power consumption-sensitive device or a device that has a relatively weak computing capability, the to-be-woken-up device may be affected.

The following provides a voice wake-up method 300 and a method 400 according to this embodiment of this application. A false wake-up arbitration device and a device for coordinating false wake-up are selected, so that a large amount of bandwidth occupied by audio data during intra-network transmission can be greatly reduced. In addition, an impact on some special to-be-woken-up devices can be reduced.

In an embodiment, a rule for selecting the false wake-up arbitration device and the device for coordinating false wake-up from a plurality of smart devices is as follows:

Rule 1: One arbitration device is selected in one room based on power consumption and a computing capability (obtained by converting one or more of a quantity of cores, a dominant frequency, and a memory size of a CPU). If the arbitration device leaves a local area network (is powered off or taken out of the room by a user), an arbitration device is reselected based on the power consumption and the computing capability.

For example, a priority order of selecting the arbitration device may be a smart TV, a smart speaker, a floor sweeping robot, a smart alarm, a smart camera, a pad, a mobile phone, a living room lamp, a smart curtain, a bedroom desk lamp, and a smart watch in sequence.

Rule 2: A plurality of devices (for example, two devices) for coordinating false wake-up are selected based on a distance between each device and a playback device, a computing capability, and power consumption conversion. Each device records information about a device for coordinating false wake-up. After a device location changes, the information about the device for coordinating false wake-up needs to be dynamically updated.

In the following, the false wake-up arbitration device is referred to as an arbitration device for short, and the device for coordinating false wake-up is referred to as a collaboration device for short. The plurality of smart devices may form a mutually trusted secure communication network, for example, in an account-based (for example, a Huawei ID), a security certificate authentication, or a personal identification number (personal identification number, PIN) code authentication manner. The plurality of smart devices may implement time synchronization in a secure network.

The following uses an example in which the playback device is a mobile phone, the collaboration device (namely, the device for coordinating false wake-up) is a smart TV and a floor sweeping robot, and the arbitration device (namely, the false wake-up arbitration device) is a smart TV for description.

Figure 5A:
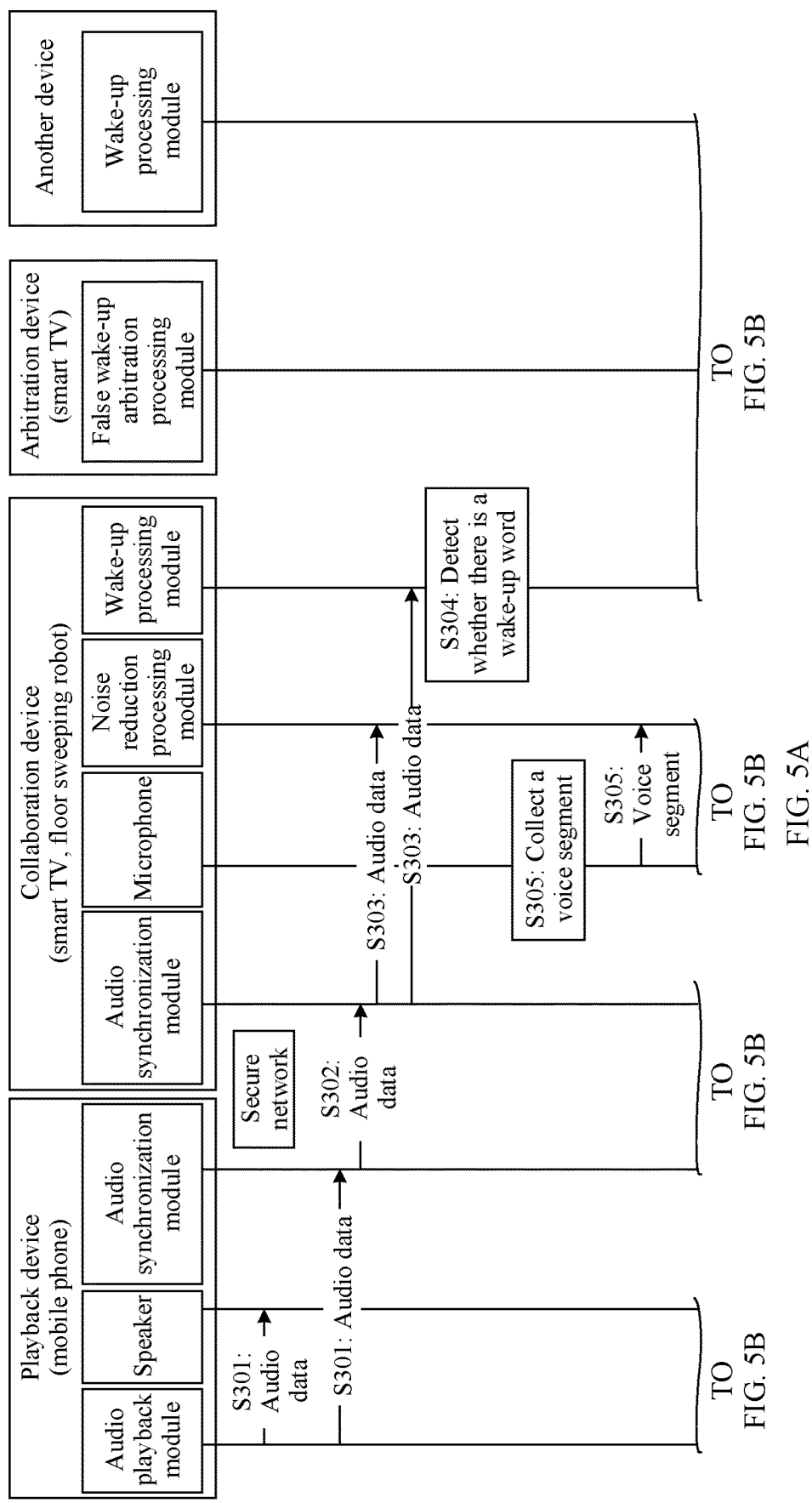
FIG. 5A and FIG. 5B are another schematic flowchart of a voice wake-up method according to an embodiment of this application.
Figure 5B:
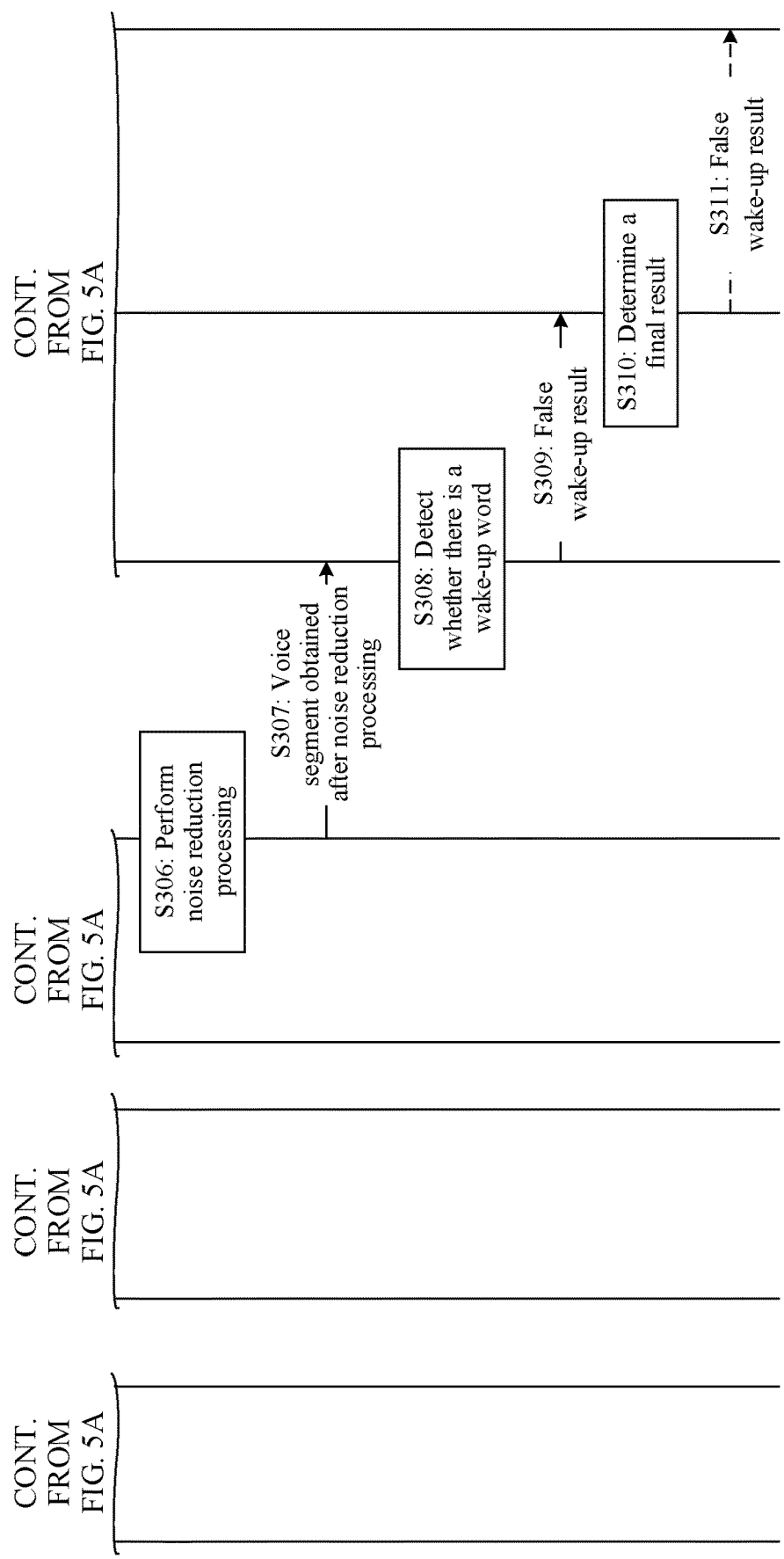

FIG. 5A and FIG. 5B are a schematic flowchart of a voice wake-up method 300 according to an embodiment of this application. As shown in FIG. 5A and FIG. 5B, the method 300 includes the following steps.

S301: A mobile phone transmits played audio data to a speaker and an audio synchronization module by using an audio playback module.

It should be understood that for S301, refer to the foregoing description of S201. For brevity, details are not described herein again.

S302: The audio synchronization module of the mobile phone sends audio to an audio synchronization module of a collaboration device (a smart TV and a floor sweeping robot) by using a secure communication network.

The mobile phone may add a timestamp to the audio data, and then send the audio data to the collaboration device. Devices connected in a same local area network can perform NTP synchronization when coordinating false wake-up. The mobile phone adds a timestamp to the audio data, and the collaboration device may determine a time segment in which noise reduction processing is performed on audio data in a receiving buffer, or may manage buffered audio data to perform buffered memory reclamation.

It should be understood that, compared with the method 200, the mobile phone may send only the audio data to the collaboration device. The mobile phone may split the audio data into audio segments, and add a timestamp to each audio segment. For a specific processing manner, refer to the description in the method 200. For brevity, details are not described herein again.

It may be understood that a playback device may start from playing audio and a video, and send the corresponding audio data to the collaboration device.

Optionally, before the audio synchronization module of the mobile phone sends the audio to the collaboration device by using the secure communication network, the method further includes:

Each device in the local area network determines an arbitration device and the collaboration device based on power consumption and computing capabilities of a plurality of devices in the local area network.

For example, Table 2 shows power consumption of a plurality of smart devices.

TABLE 2

| Power consumption of a plurality of smart devices | |
|---|---|
| Smart device | Power consumption |
| Smart TV | Socket powered device, >50 W, insensitive to power consumption |
| Smart speaker | Socket powered device, ~10 W, insensitive to power consumption |
| Floor sweeping robot | Battery powered device, 50 to 100 W, insensitive to power consumption |
| Mobile phone | Battery powered device, <5000 mAh, sensitive to power consumption |
| Smart watch | Battery powered device, <1000 mAh, very sensitive to power consumption |
| . . . | . . . |

In a possible implementation, the computing capability of each smart device may be represented by using parameters such as a quantity of cores of a central processing unit (central processing unit, CPU), a frequency of the CPU, and a memory size of each smart device.

For example, Table 3 shows CPU frequencies of a plurality of smart devices.

TABLE 3

CPU frequencies of a plurality of smart devices

| Smart device | A quantity of cores of a CPU | Dominant frequency/Hz | Memory |
| --- | --- | --- | --- |
| Smart TV | 4 | ~1.7 G | 1 G to 4 G |
| Smart speaker | 2 | ~1.3 G | 256M to 512M |
| Floor sweeping robot | 4 | ~1 G | 4 G |
| Mobile phone | 4 to 8 | ~2 G | 2 G to 6 G |
| Desk lamp | 1 | 125M | <1M |
| Smart camera | 1 | 800M | 64M |
| ... | ... | ... | ... |

In this embodiment of this application, data exchange may be performed between a plurality of devices in a same local area network. After a new device (for example, a floor sweeping robot) joins the local area network, the floor sweeping robot may send corresponding information about a computing capability and power consumption of the floor sweeping robot to another device in the local area network.

That is, each device in the local area network may learn information about a computing capability and power consumption of another device in the local area network, and each device may sort priorities of the collaboration device and the arbitration device according to a preset rule. Each device may determine one arbitration device and a plurality of collaboration devices from a plurality of devices in the local area network.

In an embodiment, after obtaining the information about the computing capability and the power consumption of the another device, each device in the local area network may perform priority sorting based on the computing capability and the power consumption of each device, so as to determine the arbitration device and the collaboration device.

For example, each device may be scored based on computing capabilities and power consumption of all devices in the local area network.

For example, for a computing capability, refer to a dominant frequency of each device, and for a score, refer to Table 4.

TABLE 4

Computing capability score for each device

| Dominant frequency | Score |
| --- | --- |
| Dominant frequency > 1.5 G | 100 |
| 1 G < dominant frequency ≤ 1.5 G | 80 |
| 500M < dominant frequency ≤ 1 G | 60 |
| 0 < dominant frequency ≤ 500M | 40 |

For example, for a score of power consumption, refer to Table 5.

TABLE 5

Power consumption score for each device

| Power consumption | | Score |
| --- | --- | --- |
| Socket powered device | | 100 |
| Battery powered device | ≥5000 mAh | 80 |
| | <5000 mAh | 60 |

Each device may determine a total score corresponding to each device in the local area network based on a sum of 50% of a computing capability score and 50% of a power consumption capability score, and select the arbitration device and the collaboration device in descending order of scores.

For example, when the local area network includes a smart TV, a smart speaker, a floor sweeping robot, a mobile phone, and a desk lamp, according to Table 2 to Table 5, each device may determine a sequence of a total score from high to low is the smart TV, the smart speaker, the floor sweeping robot, the mobile phone, and the desk lamp. Therefore, each device may determine that the arbitration device in the local area network is the smart TV, and determine that the collaboration device is the smart speaker and the floor sweeping robot. Alternatively, when the arbitration device may also be used as the collaboration device, each device may determine that the arbitration device in the local area network is the smart TV, and the collaboration device is the smart TV and the smart speaker.

In an embodiment, if two devices with a same total score may appear in the local area network, for example, two smart TVs with same power consumption and a same computing capability appear, one of the devices may be selected as the arbitration device according to the preset rule.

For example, there is a smart TV in the local area network. When another smart TV with same power consumption and a same computing capability joins the local area network, the smart TV may send identification information of the smart TV in addition to sending the power consumption of the smart TV to another device in the local area network. The identification information includes but is not limited to the following several types:

(1) a serial number (serial number, SN) code;
(2) WLAN MAC address;
(3) Bluetooth MAC address; and
(4) a read only memory (read only memory, ROM) version number of a device.

Take the serial number as an example. Each device may select the one with the smaller serial number between the two smart TVs as the arbitration device, or select the one with the larger serial number between the two smart TVs as the arbitration device.

It should be understood that the identification information of the device may not be limited to the foregoing examples, and any information that can uniquely identify the device may be used as the identification information of the device.

It should be further understood that the computing capability score and the power consumption score shown in Table 4 and Table 5 are merely examples. This is not limited in this embodiment of this application. For example, each device may output a corresponding result based on the computing capability and the power consumption by using a preset formula or a function, so as to perform sorting.

It should be further understood that, when selecting the collaboration device and the arbitration device, each device in the local area network may also select only based on the power consumption of each device, or may also select only based on the computing capability of each device.

In an embodiment, the devices in the local area network may agree on priority sorting of the collaboration device and the arbitration device.

For example, priorities of the collaboration device and the arbitration device may be sorted as: a smart TV, a smart speaker, a floor sweeping robot, a smart alarm, a smart camera, a pad, a mobile phone, a living room lamp, a smart curtain, a bedroom desk lamp, and a smart watch.

For example, the local area network includes the smart TV, the smart speaker, the floor sweeping robot, the mobile phone, and the smart watch. Therefore, each device may determine, according to the foregoing priority sequence, that the arbitration device is the smart TV, and determine that the collaboration device is the smart speaker and the floor sweeping robot. Alternatively, each device may determine that the arbitration device is the smart TV, and determine that the collaboration device is the smart TV and the smart speaker.

In an embodiment, a plurality of same devices may appear in the local area network, for example, two smart TVs both join the local area network. Another device in the local area network may use the one with the smaller serial number between the two smart TVs as the arbitration device.

In an embodiment, if a device in the local area network is powered off or disconnected from the local area network, each device may re-determine the arbitration device and the collaboration device in the local area network.

For example, the local area network includes a smart TV, a smart speaker, a floor sweeping robot, a mobile phone, and a desk lamp. Each device may periodically notify another device of whether the device is powered off or disconnected from the local area network. When the smart TV in the local area network is powered off or disconnected from the local area network, the another device in the local area network may re-determine that the arbitration device is the smart speaker and the collaboration device is the floor sweeping robot and the mobile phone. Alternatively, the another device in the local area network may re-determine that the arbitration device is the smart speaker and the collaboration device is the smart speaker and the floor sweeping robot.

Considering that an energy loss occurs when sound is transmitted in the air, when the collaboration device is determined, a device that is relatively close to the playback device may be further considered as the collaboration device.

In the foregoing embodiment, an example in which each device selects two collaboration devices from the local area network is used for description. In an actual process, each device may select three or more collaboration devices. During false wake-up determining, two devices may be selected from the three or more collaboration devices as devices for actually performing false wake-up determining.

For example, the local area network may include a mobile phone, a smart TV, a floor sweeping robot, a smart speaker, a smart camera, a smart alarm, a smart pad, and a living room lamp. Each device in the local area network may determine, from the local area network based on the manner of determining the arbitration device and the collaboration device, that the arbitration device is the smart TV and the collaboration device is the smart TV, the smart speaker, the floor sweeping robot, and the smart alarm.

When the play back device plays audio, the play back device may determine, based on a distance between the collaboration device and the playback device, two collaboration devices that actually perform false wake-up determining, and notify the another device in the local area network of information about the determined collaboration device.

For example, the mobile phone is the playback device, and the mobile phone determines, from the local area network, that devices that can be used as the collaboration device are the smart TV, the smart speaker, the floor sweeping robot, and the smart alarm. In this case, when playing audio, the mobile phone may determine a distance between each collaboration device and the mobile phone by using a Wi-Fi positioning technology. The mobile phone may select two collaboration devices closest to the mobile phone as the collaboration devices that actually perform false wake-up determining. For example, if the smart speaker and the floor sweeping robot are relatively close to the mobile phone, the mobile phone may use the smart speaker and the floor sweeping robot as the collaborative devices that actually perform false wake-up determining, and notify the another device in the local area network of the information.

In an embodiment, when playing the audio, the playback device may notify the another device in the local area network of information about the arbitration device and the collaboration device that are determined by the play back device.

In an embodiment, each device in the local area network determines the arbitration device according to the preset rule, the playback device determines the collaboration device when playing the audio, and notifies the another device in the local area network of information about the collaboration device.

In this embodiment of this application, the playback device may select a plurality of devices that are relatively close to the playback device as collaboration devices, to help avoid a problem that accuracy of false wake-up determining is reduced due to sound wave attenuation.

S303: The collaboration device transmits the audio data received by the audio synchronization module to a noise reduction processing module and a wake-up processing module.

The audio synchronization module of the collaboration device may add a delay to the audio data. For a specific processing manner, refer to the process of adding a delay by the to-be-woken-up device in the method 200. For brevity, details are not described herein again.

It should be understood that, in this embodiment of this application, the play back device, the collaboration device, and the arbitration device may be a same device. Alternatively, the collaboration device and the arbitration device may be a same device.

S304: The wake-up processing module of the collaboration device detects whether a wake-up word exists.

S305: The collaboration device collects a voice signal by using a microphone, and sends the collected voice signal to the noise reduction processing module.

S306: The collaboration device uses the audio data sent by the mobile phone as a reference signal to perform noise reduction processing on the voice signal collected by the microphone.

S307: The noise reduction processing module of the collaboration device sends the voice signal obtained after the noise reduction processing to the wake-up processing module.

S308: The wake-up processing module of the collaboration device determines whether the wake-up word exists in the voice signal obtained after the noise reduction processing.

If the voice signal obtained after the noise reduction processing in S308 does not include the wake-up word, but the audio data received by the audio synchronization module of the collaboration device in S304 includes the wake-up word, the collaboration device may determine that false wake-up occurs.

If the voice signal obtained after the noise reduction processing in S308 does not include the wake-up word, and the audio data received by the audio synchronization module of the collaboration device in S304 does not include the wake-up word, the collaboration device determines that false wake-up occurs.

If the voice signal obtained after the noise reduction processing in S308 includes the wake-up word, and the audio data received by the audio synchronization module of the collaboration device in S304 includes the wake-up word, the collaboration device determines that false wake-up does not occur.

If the voice signal obtained after the noise reduction processing in S308 includes the wake-up word, but the audio data received by the audio synchronization module of the collaboration device in S304 does not include the wake-up word, the collaboration device determines that false wake-up does not occur.

When the play back device (for example, the mobile phone) plays the audio, in addition to playing the audio by using the speaker, the playback device may further transmit same audio data to the collaboration device by using the secure communication network. After collecting the voice signal by using the microphone, the collaboration device performs noise reduction processing on the collected voice signal by using the audio data transmitted by the play back device by using the local area network. A to-be-woken-up device performs wake-up processing by using the voice signal obtained after the noise reduction processing.

S309: The collaboration device (the floor sweeping robot) sends a false wake-up result to the smart TV.

S310: The smart TV determines, based on the false wake-up result returned by the floor sweeping robot and a false wake-up result determined by the smart TV, whether the result is a final false wake-up result.

In an embodiment, if a result determined by the smart TV is false wake-up, and a result determined by the floor sweeping robot is false wake-up, the smart TV may determine that a final arbitration result is false wake-up. If either the smart TV or the floor sweeping robot determines that the result is not false wake-up, the smart TV may determine that the final arbitration result is not false wake-up. If both the smart TV and the floor sweeping robot determine that the result is not false wake-up, the smart TV may determine that the final arbitration result is not false wake-up.

S311: If the smart TV determines that the final arbitration result is false wake-up, the smart TV sends the arbitration result of false wake-up to the another device.

In this embodiment of this application, the another device may collect a voice signal in an environment, and may not perform a wake-up operation after collecting the voice signal but wait for a false wake-up result sent by the arbitration device. After the arbitration device determines the final false wake-up result, if the arbitration device determines that the final result is false wake-up, the arbitration device may send the false wake-up result to the another device in the local area network, and the another device may not perform wake-up based on the false wake-up result.

It should be understood that when determining that the another device is not the arbitration device or the collaboration device, the another device may not perform false wake-up detection (each device in the local area network can determine the arbitration device and the collaboration device).

Optionally, the arbitration result carries a timestamp. Herein, a purpose of carrying the timestamp in the arbitration result by the arbitration device is that in some extreme cases, when a plurality of pieces of wake-up audio are generated in a very short time, the timestamp may be used to distinguish a sequence.

It should be understood that if the smart TV determines that the final arbitration result is not false wake-up, the smart TV may not send the arbitration result to the another device.

If the another device does not receive the false wake-up result sent by the arbitration device within preset duration after collecting the voice signal in the environment, the another device may consider that the result is not false wake-up, and perform the wake-up operation based on the voice signal collected by the microphone.

Alternatively, if the another device does not receive the false wake-up result sent by the arbitration device within preset duration after receiving an indication that is of the collaboration device in the local area network and that is sent by the play back device, the another device may consider that the result is not false wake-up, and perform the wake-up operation based on the voice signal collected by the microphone.

It should be further understood that if the smart TV determines that the final arbitration result is not false wake-up, the smart TV may also send a result indicating that false wake-up does not occur to the another device. The another device may perform the wake-up operation based on the voice signal collected by the microphone. The another device may directly perform wake-up without detecting the wake-up word.

According to the voice wake-up method in this embodiment of this application, the arbitration device and the collaboration device are determined in advance, the plurality of collaboration devices separately determine whether false wake-up occurs, and the arbitration device determines the final false wake-up result. This helps reduce false wake-up caused when the device receives external noise. In addition, some power consumption-sensitive devices or devices with relatively weak computing capabilities can also be prevented from performing false wake-up detection, thereby helping reduce power consumption of the devices.

Figure 6:
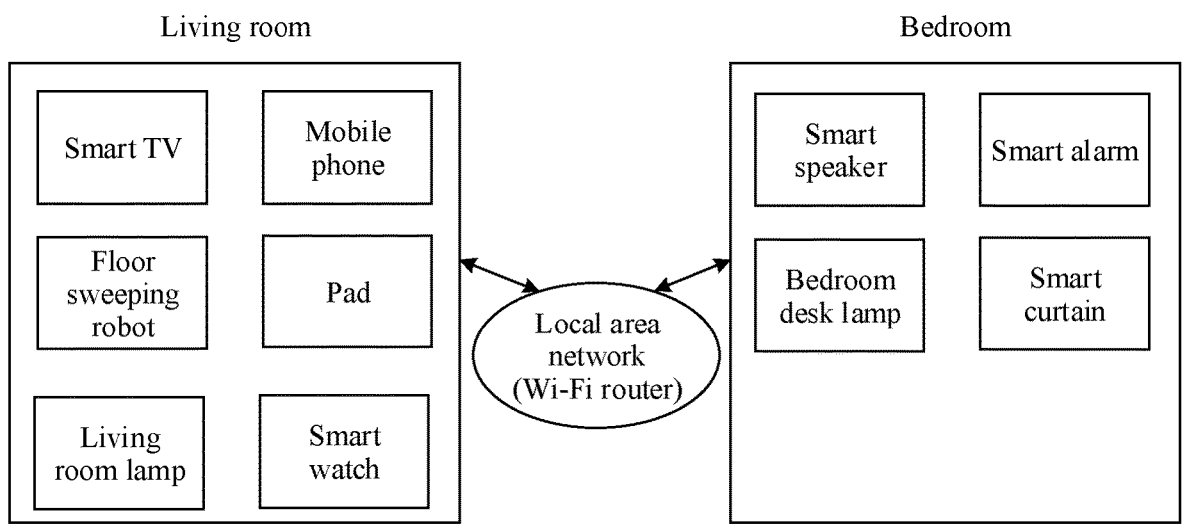
FIG. 6 is a schematic diagram of another application scenario to which a technical solution according to an embodiment of this application is applicable.

A case in which a plurality of smart voice devices are placed in one space is considered above, and a case in which a plurality of voice devices are placed in different spaces is considered below:

FIG. 6 shows another application scenario of a technical solution according to an embodiment of this application. As shown in FIG. 6, different smart devices are separately placed in a living room and a bedroom of a user. A smart TV, a mobile phone, a floor sweeping robot, a pad, a living room lamp, and a smart watch are placed in the living room. Smart voice devices such as a smart speaker, a smart alarm, a bedroom desk lamp, and a smart curtain are placed in the bedroom. Smart voice devices in the living room and bedroom can be connected by using a local area network (Wi-Fi router). Quality of sound transmission is poor or sound even cannot be transmitted because of separated rooms.

With a Wi-Fi positioning technology; each smart device can measure a location of each smart device, calculate whether there is a wall between smart devices, and determine, based on a floor plan, a room in which each smart device is located, or determine, based on setting information used when the smart device registers with a network, a room in which the smart device is located.

It should be understood that, in this embodiment of this application, a technology for measuring a location of each smart device may be the conventional technology; or another positioning technology in the future. This is not limited in this embodiment of this application.

These smart devices are distributed in the living room and the bedroom. A false wake-up arbitration device may be separately selected from the living room and the bedroom. According to the foregoing priority policy, the smart TV may be selected as the false wake-up arbitration device in the living room, and the smart speaker may be selected as the false wake-up arbitration device in the bedroom.

Figure 7B:
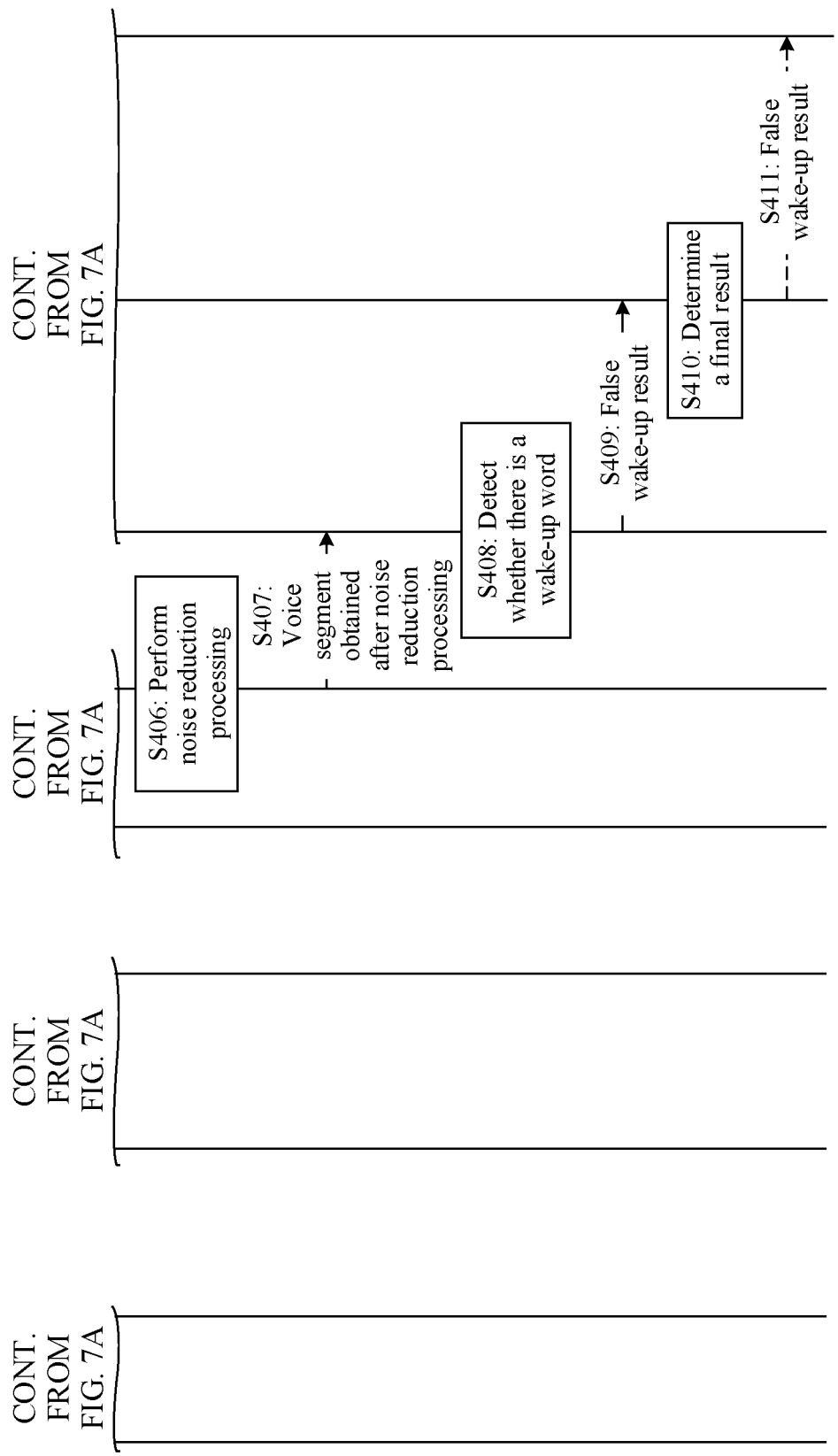

FIG. 7A and FIG. 7B are a schematic flowchart of a voice wake-up method 400 according to an embodiment of this application. As shown in FIG. 7A and FIG. 7B, the method 400 includes the following steps.

S401: A mobile phone transmits played audio data to a speaker and an audio synchronization module by using an audio playback module.

S402: The audio synchronization module of the mobile phone sends audio to an audio synchronization module of a collaboration device (a smart TV and a floor sweeping robot) in a bedroom by using a secure communication network.

It should be understood that a location of each smart device in a plurality of smart devices is considered in the method 400, and smart devices in the bedroom and smart devices in a living room may be determined. An arbitration device and a collaboration device in the bedroom are selected from the smart devices in the bedroom; and an arbitration device and a collaboration device in the living room are selected from the smart devices in the living room. As shown in FIG. 7A and FIG. 7B, a smart TV and a floor sweeping robot may be selected as collaboration devices for a plurality of devices in the living room, and the smart TV may be selected as the arbitration device. A smart speaker and a smart alarm may be selected as collaboration devices for a plurality of devices in the bedroom, and the smart speaker may be selected as the arbitration device.

It should be further understood that, for a manner of selecting the collaboration device and the arbitration device from the smart device in the bedroom, refer to the method 300, and for a manner of selecting the collaboration device and the arbitration device from the smart device in the living room, refer to the method 300. For brevity, details are not described herein again.

S403: The collaboration device (the smart TV and the floor sweeping robot) in the living room transmits audio data received by an audio synchronization module of the collaboration device to a noise reduction processing module and a wake-up processing module.

S404: The wake-up processing module of the collaboration device detects whether a wake-up word exists.

S405: The collaboration device collects a voice signal by using a microphone, and sends the collected voice signal to the noise reduction processing module.

S406: The collaboration device uses the audio data sent by the mobile phone as a reference signal to perform noise reduction processing on the voice signal collected by the microphone.

S407: The noise reduction processing module of the collaboration device sends the voice signal obtained after the noise reduction processing to the wake-up processing module.

S408: The wake-up processing module of the collaboration device determines whether the wake-up word exists in the voice signal obtained after performing noise reduction.

S409: The floor sweeping robot sends a false wake-up result to the smart TV.

S410: The smart TV determines, based on the false wake-up result returned by the floor sweeping robot and a false wake-up result determined by the smart TV, whether the result is a final false wake-up result.

S411: If the smart TV determines that a final arbitration result is false wake-up, the smart TV sends the arbitration result of false wake-up to another device in the living room.

It may be understood that the smart TV may send the final arbitration result to all other devices in a local area network, including devices in the living room and bedroom.

It should be understood that for descriptions of S403 to S411, refer to S303 to S311 in the method 300. For brevity, details are not described herein again.

In the method 400, a plurality of devices in the local area network may be combined based on a Wi-Fi indoor positioning technology and the floor plan, different locations of devices in a residence are measured, the devices are grouped based on the locations of the devices (for example, the devices may be divided into devices located in the bedroom and devices located in the living room), and whether there is a wall between the devices can be calculated. This can avoid an impact that although a distance between a play back device and the collaboration device is short, there may be a wall between the playback device and the collaboration device. Devices in the group are located in a same physical space, and there is no wall block between the devices, so that accuracy of false wake-up determining can be improved.

For example, a play back device in the living room is the mobile phone. If locations of all devices are not grouped, the smart speaker and the smart alarm that are located in the bedroom may be selected as the collaboration devices when the collaboration device is selected. There may be a wall between the mobile phone and the smart speaker and the smart alarm. In this case, if the smart speaker and the smart alarm perform the false wake-up determining, the false wake-up result may be inaccurate. After the plurality of devices are spatially grouped, the play back device in the living room may select the collaboration device from the devices in the living room during playback, and a playback device in the bedroom may select the collaboration device from the devices in the bedroom during playback. This helps improve accuracy of false wake-up determining.

It should be understood that for the arbitration device, one device may be separately selected from the bedroom and the living room as the arbitration devices, or only one device may be selected from all devices in the bedroom and the living room as the arbitration device.

According to the voice wake-up method in this embodiment of this application, different arbitration devices and collaboration devices are selected in different spaces. This helps reduce false wake-up caused when a device in each space receives external noise. In addition, some power consumption-sensitive devices or devices with relatively weak computing capabilities can also be prevented from performing false wake-up detection, thereby helping reduce power consumption of the devices.

With reference to the foregoing embodiments and related accompanying drawings, an embodiment of this application provides a voice wake-up method 500. The method may be implemented in the electronic device with a smart voice function shown in FIG. 1 (for example, a smart TV, a smart speaker, or a floor sweeping robot). As shown in FIG. 8, the method may include the following steps.

S501: A first electronic device collects a first voice signal in an environment in which the first electronic device is located.

It should be understood that the first electronic device may be located in a local area network, and the local area network may further include a playback device and a second electronic device.

Optionally, the first electronic device and the second electronic device are two devices with strongest computing capabilities in the local area network; and/or the first electronic device and the second electronic device are non-power-consumption-sensitive devices in the local area network.

For example, the first electronic device may be the smart TV in the method 300 or the method 400.

That a first electronic device collects a first voice signal in an environment in which the first electronic device is located may be that the first electronic device collects the first voice signal in the environment in which the first electronic device is located by using a microphone of the first electronic device.

S502: The first electronic device obtains, in a wired or wireless communication manner, an audio signal corresponding to audio in a collection period of the first voice signal.

For example, when the play back device in the environment in which the first electronic device is located plays audio, the playback device may send an audio signal corresponding to the audio to the first electronic device and the second electronic device. As in the method 300, when playing audio, the mobile phone may send audio data corresponding to the audio to the smart TV and the floor sweeping robot.

Optionally, the audio signal includes a timestamp, and the timestamp may be used to indicate a generation time of the audio signal.

Optionally, the first electronic device and the second electronic device may be selected by the playback device. For a specific selecting process, refer to descriptions in the method 300. For brevity, details are not described herein again.

S503: The first electronic device determines a first false wake-up result based on the first voice signal and the audio signal.

Optionally, that the first electronic device determines a first false wake-up result based on the first voice signal and the audio signal includes:

The first electronic device performs noise reduction processing on the first voice signal based on the audio signal to obtain a second voice signal.

The first electronic device determines the first false wake-up result based on the audio signal and the second voice signal.

It should be understood that for a process in which the first electronic device determines the first false wake-up result, refer to the processes in S303 to S308 in the method 300. For brevity, details are not described herein again.

S504: The first electronic device receives a second false wake-up result sent by the second electronic device, where the second false wake-up result is obtained by the second electronic device based on a collected second voice signal and the audio signal.

It should be understood that for a process in which the second electronic device determines the second false wake-up result based on the collected second voice signal and the audio signal, reference may also be made to a process in the method S303 to S308. For brevity, details are not described herein again.

For example, the first electronic device is the smart TV in the method 300, the second electronic device may be the floor sweeping robot in the method 300, and the smart TV may determine the first false wake-up result, or may receive the second false wake-up result sent by the floor sweeping robot.

S505: The first electronic device determines a third false wake-up result based on the first false wake-up result and the second false wake-up result, where the third false wake-up result is used to indicate whether a wake-up operation needs to be performed on a to-be-woken-up device in the local area network.

For example, when the first false wake-up result is false wake-up and the second false wake-up result is false wake-up, the first electronic device determines that the third false wake-up result is false wake-up.

Alternatively, when the first false wake-up result is not false wake-up and the second false wake-up result is false wake-up, the first electronic device determines that the third false wake-up result is not false wake-up.

Alternatively, when the first false wake-up result is false wake-up and the second false wake-up result is not false wake-up, the first electronic device determines that the third false wake-up result is not false wake-up.

Alternatively, when the first false wake-up result is not false wake-up and the second false wake-up result is not false wake-up, the first electronic device determines that the third false wake-up result is not false wake-up.

S506: The first electronic device sends the third false wake-up result to another electronic device other than the first electronic device in the local area network.

In this embodiment of this application, the another electronic device other than the first electronic device in the local area network may also receive the voice signal in the environment. After collecting the voice signal in the environment, the another device may not perform a wake-up operation by using the voice signal first, but wait for a false wake-up result sent by the first electronic device. After the first electronic device determines that the final false wake-up result is false wake-up, the first electronic device may send the false wake-up result to the another device in the local area network, and the another device may not perform the wake-up operation based on the false wake-up result.

In an embodiment, if the first electronic device determines that the third false wake-up result is not false wake-up, the first electronic device may not send the third false wake-up result to the another device in the local area network. For example, the another device may start a timer after receiving the voice signal, and before the timer expires, the another device may wait for the third false wake-up result sent by the first electronic device, without performing the wake-up operation. After the timer expires, the another device may perform the wake-up operation based on the collected voice signal.

In an embodiment, if the first electronic device determines that the third false wake-up result is not false wake-up, the first electronic device may also send the third false wake-up result to the another device in the local area network. After receiving the third false wake-up result, the another electronic device may perform the wake-up operation by using the collected voice signal.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that, in the embodiments, division into modules is an example, and is merely logical function division. During actual implementation, there may be another division manner.

Figure 9:
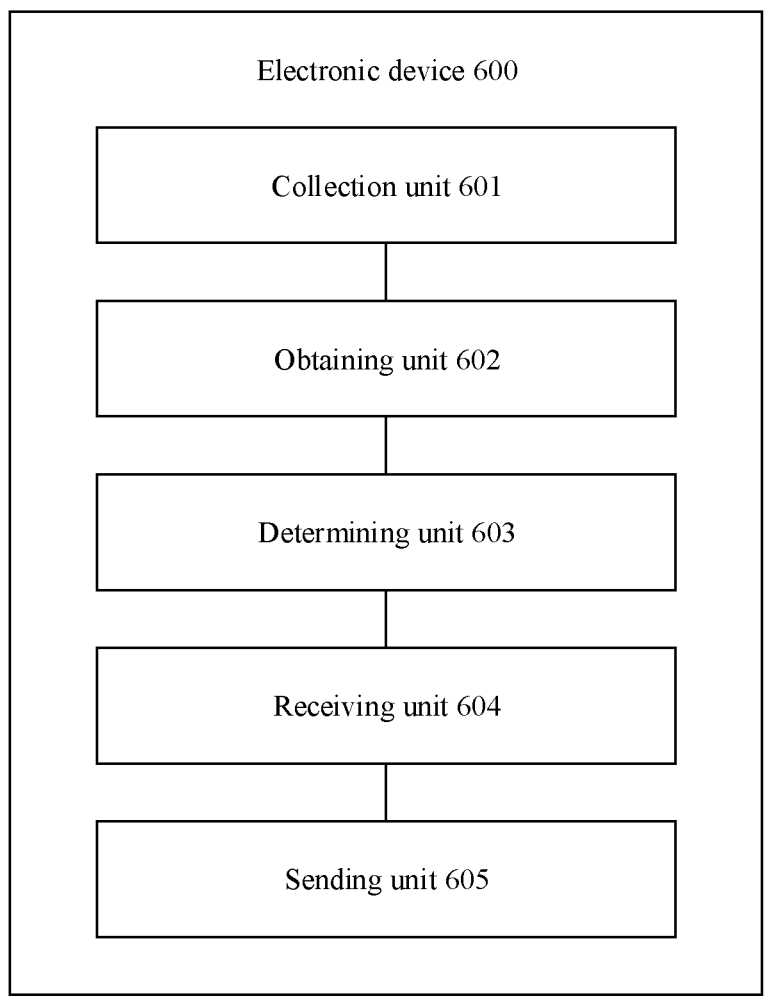
FIG. 9 is a schematic block diagram of an electronic device according to an embodiment of this application.

When each function module corresponding to each function is obtained through division, FIG. 9 is a schematic diagram of a possible composition of an electronic device 600 in the foregoing embodiments. As shown in FIG. 9, the electronic device 600 may include: a collection unit 601, an obtaining unit 602, a determining unit 603, a receiving unit 604, and a sending unit 605.

The collection unit 601 may be configured to support the electronic device 600 in performing the step 501 and the like, and/or another process used for the technology described in this specification.

The obtaining unit 602 may be configured to support the electronic device 600 in performing the step 502 and the like, and/or another process used for the technology described in this specification.

The determining unit 603 may be configured to support the electronic device 600 in performing the step 503, the step 505, and the like, and/or another process used for the technology described in this specification.

The receiving unit 604 may be configured to support the electronic device 600 in performing the step 504 and the like, and/or another process used for the technology described in this specification.

The sending unit 605 may be configured to support the electronic device 600 in performing the step 506 and the like, and/or another process used for the technology described in this specification.

It should be noted that all related content of the steps in the foregoing method embodiments may be cited in function descriptions of corresponding function modules. Details are not described herein again.

The electronic device provided in this embodiment is configured to perform the voice wake-up method. Therefore, an effect the same as the effect of the foregoing implementation methods can be achieved.

When an integrated unit is used, the electronic device may include a processing module, a storage module, and a communications module. The processing module may be configured to control and manage an action of the electronic device. For example, the processing module may be configured to support the electronic device in performing the steps performed by the collection unit 601, the obtaining unit 602, the determining unit 603, the receiving unit 604, and the sending unit 605. The storage module may be configured to support the electronic device in storing program code, data, and the like. The communications module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

Figure 10:
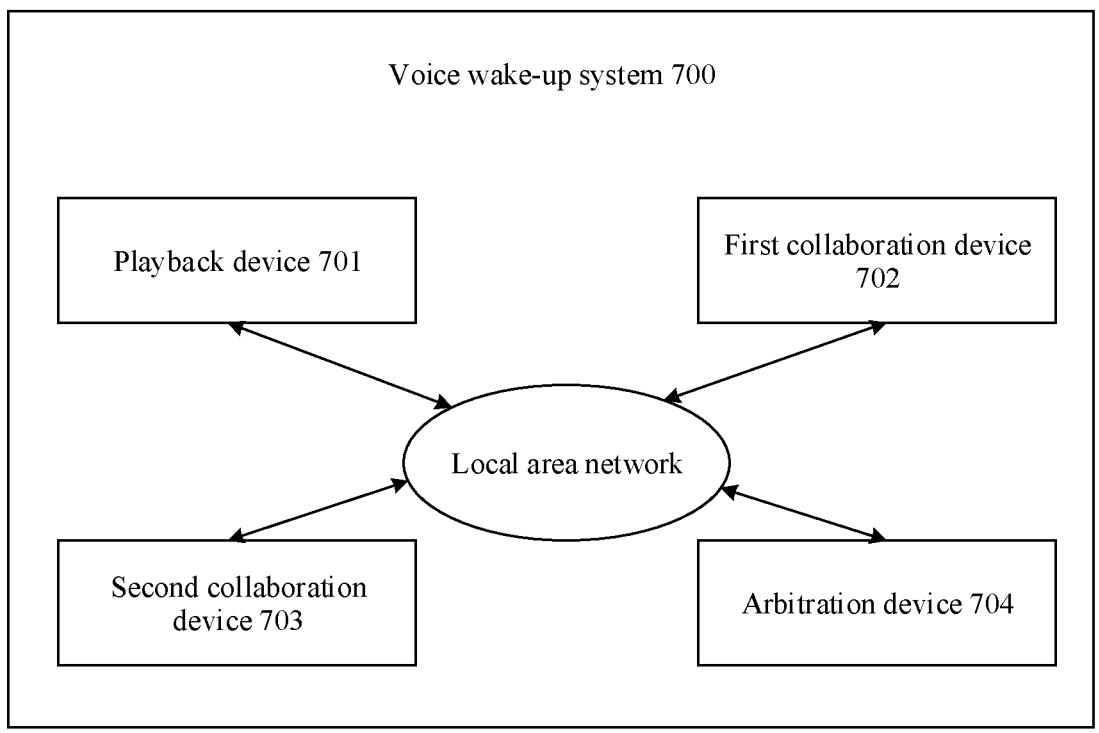
FIG. 10 is a schematic block diagram of a voice wake-up system according to an embodiment of this application.

FIG. 10 is a schematic block diagram of a voice wake-up system 700 according to an embodiment of this application. As shown in FIG. 10, the voice wake-up system 700 includes a playback device 701, a first collaboration device 702, a second collaboration device 703, and an arbitration device 704 that are in a same local area network. The local area network may further include more or fewer electronic devices. For example, the playback device 701 and the first collaboration device 702 may be a same device. The playback device 701, the first collaboration device 702, and the arbitration device 704 may be a same device.

For example, the play back device 701 may be the mobile phone in the method 300, the first collaboration device 702 may be the smart TV in the method 300, and the second collaboration device may be the floor sweeping robot in the method 300. The collaboration device may be the smart TV in the method 300.

For example, the play back device 701 may be the mobile phone in the method 400, the first collaboration device 702 may be the smart TV in the method 400, and the second collaboration device may be the floor sweeping robot in the method 400. The collaboration device may be the smart TV in the method 400.

An embodiment further provides a computer storage medium. The computer storage medium stores computer instructions. When the computer instructions are run on an electronic device, the electronic device is enabled to perform the related method steps, to implement the voice wake-up method in the foregoing embodiments.

An embodiment further provides a computer program product. When the computer program product runs on a computer, the computer is enabled to perform the related steps, to implement the voice wake-up method in the foregoing embodiments.

In addition, an embodiment of this application further provides an apparatus. The apparatus may be specifically a chip, a component, or a module. The apparatus may include a processor and a memory that are connected. The memory is configured to store computer execution instructions. When the apparatus runs, the processor may execute the computer execution instructions stored in the memory, to enable the chip to perform the voice wake-up method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented based on a requirement, in other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiment is merely an example. For example, division into the modules or units is merely logical function division. There may be another division manner in actual implementation. For example, a plurality of units or components may be combined or integrated into another apparatus, or some features may be ignored or not performed. In addition, the displayed or discussed mutual coupling or direct coupling or communication connections may be implemented through some interfaces. The indirect coupling or communication connections between the apparatuses or units may be implemented in an electronic form, a mechanical form, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voice wake-up method performed by a first electronic device, wherein the first electronic device is located in a local area network, the local area network further comprises a second electronic device, and the method comprises:
    collecting a first voice signal in an environment in which the first electronic device is located;
    obtaining, in a wired or wireless communication manner, an audio signal corresponding to audio played by a playback device;
    determining a first false wake-up result based on the first voice signal and the audio signal;
    receiving a second false wake-up result from the second electronic device;
    determining a third false wake-up result based on the first false wake-up result and the second false wake-up result, wherein the third false wake-up result indicates whether a wake-up operation needs to be performed on a to-be-woken-up device in the local area network; and
    sending the third false wake-up result to another electronic device other than the first electronic device in the local area network.

2. The method according to claim 1, wherein the determining a third false wake-up result based on the first false wake-up result and the second false wake-up result comprises:
    when the first false wake-up result is false wake-up and the second false wake-up result is false wake-up, determining that the third false wake-up result is false wake-up; or
    when the first false wake-up result is not false wake-up or the second false wake-up result is not false wake-up, determining that the third false wake-up result is not false wake-up.

3. The method according to claim 1, wherein the determining a first false wake-up result based on the first voice signal and the audio signal comprises:
    performing noise reduction processing on the first voice signal based on the audio signal to obtain a second voice signal; and
    determining the first false wake-up result based on the audio signal and the second voice signal.

4. The method according to claim 3, wherein the determining the first false wake-up result based on the audio signal and the second voice signal comprises:
    determining that the audio signal comprises a wake-up word and the second voice signal does not comprise the wake-up word, and in response, determining that the first false wake-up result is false wake-up.

5. The method according to claim 1, wherein the audio signal comprises a timestamp.

6. A first electronic device, comprising:
    one or more processors; and
    one or more memories, wherein
    the one or more memories store one or more computer programs, the one or more computer programs comprise instructions, and when the instructions are executed by the one or more processors, the first electronic device is configured to perform:
    collect a first voice signal in an environment in which the first electronic device is located;
    obtain, in a wired or wireless communication manner, an audio signal corresponding to audio played by a playback device;
    determine a first false wake-up result based on the first voice signal and the audio signal;
    receive a second false wake-up result from a second electronic device;
    determine a third false wake-up result based on the first false wake-up result and the second false wake-up result, wherein the third false wake-up result indicates whether a wake-up operation needs to be performed on a to-be-woken-up device in the local area network; and
    send the third false wake-up result to another electronic device other than the first electronic device in the local area network.

7. The first electronic device according to claim 6, wherein the determine a third false wake-up result based on the first false wake-up result and the second false wake-up result comprises:

when the first false wake-up result is false wake-up and the second false wake-up result is false wake-up, determine that the third false wake-up result is false wake-up; or when the first false wake-up result is not false wake-up or the second false wake-up result is not false wake-up, determine that the third false wake-up result is not false wake-up.

8. The first electronic device according to claim 6, wherein the determine a first false wake-up result based on the first voice signal and the audio signal comprises:
   perform noise reduction processing on the first voice signal based on the audio signal to obtain a second voice signal; and
   determine the first false wake-up result based on the audio signal and the second voice signal.

9. The first electronic device according to claim 8, wherein the determine the first false wake-up result based on the audio signal and the second voice signal comprises:
   determine whether the audio signal comprises a wake-up word, and the second voice signal does not comprise the wake-up word, and in response, determine that the first false wake-up result is false wake-up.

10. The first electronic device according to claim 6, wherein the audio signal comprises a timestamp.

11. A voice wake-up method performed by a voice wake-up system, the system comprises a playback device, a first collaboration device, a second collaboration device, and an arbitration device that are in a same local area network, and the method comprises:
   playing audio, by the playback device;
   sending, by the playback device in a wired or wireless communication manner, an audio signal corresponding to the audio to the first collaboration device and the second collaboration device;
   respectively collecting, by the first collaboration device and the second collaboration device, a first voice signal and a second voice signal in an environment in which the first collaboration device and the second collaboration device are located while the playback device is playing the audio;
   determining, by the first collaboration device, a first false wake-up result based on the first voice signal and the audio signal;
   determining, by the second collaboration device, a second false wake-up result based on the second voice signal and the audio signal;
   respectively sending, by the first collaboration device and the second collaboration device, the first false wake-up result and the second false wake-up result to the arbitration device;
   determining, by the arbitration device, a third false wake-up result based on the first false wake-up result and the second false wake-up result, wherein the third false wake-up result indicates whether a wake-up operation needs to be performed on a to-be-woken-up device in the local area network; and
   sending, by the arbitration device, the third false wake-up result to another device other than the arbitration device in the local area network.

12. The method according to claim 11, wherein the method further comprises:
   receiving, by the playback device, capability information sent by another device other than the playback device in the local area network, wherein the capability information is used to indicate a computing capability and/or a power consumption status of the another device;
   determining, by the playback device, that the first collaboration device and the second collaboration device are in the local area network based on the capability information; and
   sending, by the playback device, indication information to the another device, wherein the indication information indicates that the first collaboration device and the second collaboration device are in the local area network.

13. The method according to claim 12, wherein the determining, by the playback device, that the first collaboration device and the second collaboration device are in the local area network based on the capability information comprises:
   determining, by the playback device, a plurality of collaboration devices in the local area network based on the capability information, wherein the plurality of collaboration devices comprise the first collaboration device and the second collaboration device; and
   determining, by the playback device, the first collaboration device and the second collaboration device from the plurality of collaboration devices based on a distance between the playback device and each collaboration device in the plurality of collaboration devices.

14. The method according to claim 13, wherein a first distance between the first collaboration device and the playback device or a second distance between the second collaboration device and the playback device is less than a third distance, and the third distance is a distance between the playback device and any collaboration device in other collaboration devices in the plurality of collaboration devices other than the first collaboration device and the second collaboration device.

15. The method according to claim 11, wherein the audio signal comprises a timestamp.

16. A voice wake-up system, wherein the system comprises a playback device, a first collaboration device, a second collaboration device, and an arbitration device that are in a same local area network, wherein
   the first collaboration device is configured to collect a first voice signal in an environment in which the first collaboration device is located;
   the second collaboration device is configured to collect a second voice signal in an environment in which the second collaboration device is located;
   the playback device is configured to: when the first collaboration device and the second collaboration device respectively collect the first voice signal and the second voice signal, if the playback device is playing audio, send, in a wired or wireless communication manner, an audio signal corresponding to the audio to the first collaboration device and the second collaboration device;
   the first collaboration device is further configured to determine a first false wake-up result based on the first voice signal and the audio signal;
   the second collaboration device is further configured to determine a second false wake-up result based on the second voice signal and the audio signal;
   the first collaboration device is further configured to send the first false wake-up result to the arbitration device;
   the second collaboration device is further configured to send the second false wake-up result to the arbitration device;

the arbitration device is configured to determine a third false wake-up result based on the first false wake-up result and the second false wake-up result, wherein the third false wake-up result indicates whether a wake-up operation needs to be performed on a to-be-woken-up device in the local area network; and the arbitration device is further configured to send the third false wake-up result to another device other than the arbitration device in the local area network.

17. The system according to claim 16, wherein the playback device is configured to:

receive capability information sent by another device other than the playback device in the local area network, wherein the capability information indicates a computing capability and/or a power consumption status of the another device;

determine that the first collaboration device and the second collaboration device are in the local area network based on the capability information; and send indication information to the another device, wherein the indication information is used to indicate that the first collaboration device and the second collaboration device are in the local area network.

18. The system according to claim 17, wherein the playback device is configured to:

determine a plurality of collaboration devices in the local area network based on the capability information, wherein the plurality of collaboration devices comprise the first collaboration device and the second collaboration device; and determine the first collaboration device and the second collaboration device from the plurality of collaboration devices based on a distance between the playback device and each collaboration device in the plurality of collaboration devices.

19. The system according to claim 18, wherein a first distance between the first collaboration device and the playback device or a second distance between the second collaboration device and the playback device is less than a third distance, and the third distance is a distance between the playback device and any collaboration device in other collaboration devices in the plurality of collaboration devices other than the first collaboration device and the second collaboration device.

20. The system according to claim 16, wherein the audio signal comprises a timestamp.

* * * * *